United States Patent
Zhuge et al.

(10) Patent No.: US 10,090,920 B1
(45) Date of Patent: Oct. 2, 2018

(54) FIBER KERR NONLINEAR NOISE ESTIMATION

(71) Applicants: Qunbi Zhuge, Kanata (CA); Michael Andrew Reimer, Stittsville, CA (US); Maurice O'Sullivan, Ottawa (CA)

(72) Inventors: Qunbi Zhuge, Kanata (CA); Michael Andrew Reimer, Stittsville, CA (US); Maurice O'Sullivan, Ottawa (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 15/461,718

(22) Filed: Mar. 17, 2017

(51) Int. Cl.
   *H04B 10/079* (2013.01)
   *H04B 10/2507* (2013.01)
   *G06N 99/00* (2010.01)

(52) U.S. Cl.
   CPC ..... *H04B 10/07953* (2013.01); *G06N 99/005* (2013.01); *H04B 10/2507* (2013.01)

(58) Field of Classification Search
   CPC .......... H04B 10/0795; H04B 10/07953; H04B 10/2507; H04B 10/0775; H04B 10/07955; H04B 10/07951; H04B 10/2543; G06N 99/005; H04J 14/0271
   USPC .......................... 398/25, 26, 27, 28, 33, 202
   See application file for complete search history.

(56) References Cited

U.S. PATENT DOCUMENTS

| | | | | |
|---|---|---|---|---|
| 7,376,358 B2* | 5/2008 | Roberts | ............ | H04B 10/25137 327/306 |
| 7,756,421 B2* | 7/2010 | Roberts | .............. | H04B 10/2543 398/158 |
| 9,768,875 B2* | 9/2017 | Zhuge | .................. | H04B 10/532 |
| 9,768,880 B2* | 9/2017 | Zhuge | .................... | H04B 10/58 |
| 2004/0184398 A1* | 9/2004 | Walton | .................. | H04L 1/0003 370/203 |
| 2004/0208271 A1* | 10/2004 | Gruenberg | ......... | H03H 17/0283 375/355 |
| 2010/0183060 A1* | 7/2010 | Lee | ......................... | H04L 7/042 375/222 |
| 2011/0085797 A1* | 4/2011 | Xu | ......................... | H04B 10/60 398/27 |

(Continued)

OTHER PUBLICATIONS

Choi, et al., "Nonlinearity-tolerant OSNR estimation technique for coherent optical systems," 2015 Optical Fiber communications Conference and Exhibition (OFC), Los Angeles, CA, 2015, Paper W4D.2.

(Continued)

*Primary Examiner* — Hibret Woldekidan
(74) *Attorney, Agent, or Firm* — Integral Intellectual Property Inc.; Miriam Paton; Amy Scouten

(57) ABSTRACT

A method of fiber Kerr nonlinear noise estimation in an optical transmission system comprises recovering received symbols from a received signal, isolating a noise component of the received signal, estimating coefficients of a matrix based on cross-correlations between the isolated noise component and the fields of a triplet of received symbols or training symbols or estimated transmitted symbols, estimating doublet correlations of the product or the quotient of the isolated noise component and the field of a received symbol or of a training symbol or of an estimated transmitted symbol, and estimating one or more parameters related to nonlinear noise based on the estimated coefficients of the matrix and based on the estimated doublet correlations.

20 Claims, 28 Drawing Sheets

(56) References Cited

U.S. PATENT DOCUMENTS

| | | | |
|---|---|---|---|
| 2015/0071174 A1* | 3/2015 | Hui | H03M 7/3073 |
| | | | 370/328 |
| 2015/0171972 A1* | 6/2015 | Xie | H04B 10/616 |
| | | | 398/205 |
| 2016/0233963 A1* | 8/2016 | Zhuge | H04B 10/516 |
| 2016/0323091 A1* | 11/2016 | Inoue | H04L 27/38 |
| 2017/0041078 A1* | 2/2017 | Le | H04B 10/2543 |

OTHER PUBLICATIONS

Dong, et al., "OSNR monitoring for QPSK and 16-QAM systems in presence of fiber nonlinearities for digital coherent receivers," Opt. Express 20, 19520-19534 (2012).

* cited by examiner

FIBER KERR NONLINEAR NOISE ESTIMATION

TECHNICAL FIELD

This document relates to the technical field of estimating nonlinear characteristics of a channel in an optical fiber communication system.

BACKGROUND

For long-haul optical transmission, the link accumulated optical noise consists of linear and nonlinear contributions. The linear noise results from optical amplification, that is, amplified spontaneous emission (ASE) noise. An important nonlinear noise results from the Kerr effect in optical fiber. The ratio of linear and nonlinear noise depends on the power of optical signals during transmission. At small launch power, the link accumulated noise is dominated by linear noise due to low optical signal-to-noise ratio (OSNR). At high launch power, the fiber nonlinearities can dominate. The highest SNR, which includes other power-independent noise such as transceiver internal noise, is achieved at a launch power where a fixed proportion of linear and nonlinear optical noise is approximately 2 to 1.

Separate measurement of linear and nonlinear optical noise provides a means of optical power optimization, capacity estimation, and capacity maximization. However, it is not straightforward to distinguish linear and nonlinear noise in the time domain. Furthermore, direct OSNR measurement in the frequency domain becomes impractical as the available bandwidth of optical fibers is completely occupied by signals for higher spectral efficiency.

It has been proposed in Zhenhua Dong, Alan Pak Tao Lau, and Chao Lu, "OSNR monitoring for QPSK and 16-QAM systems in presence of fiber nonlinearities for digital coherent receivers," Opt. Express 20, 19520-19534 (2012) and in H. G. Choi, J. H. Chang, Hoon Kim and Y. C. Chung, "Nonlinearity-tolerant OSNR estimation technique for coherent optical systems," 2015 Optical Fiber Communications Conference and Exhibition (OFC), Los Angeles, Calif., 2015, Paper W4D.2 to use the correlation of amplitude noise or symbol amplitude on received symbols to derive the nonlinear noise. However, accuracy of results depends on net chromatic dispersion (CD), fiber type, fiber length, inline CD compensation and so forth.

SUMMARY

Estimating intra-channel Kerr nonlinear noise-to-signal ratio based on received signals in coherent optical receivers is described. Estimates of intra-channel Kerr nonlinear noise-to-signal ratio are derived from measured triplet coefficients in the received noise.

Estimating total Kerr nonlinear noise-to-signal ratio based on received signals in coherent optical receivers is described. Estimates of total Kerr nonlinear noise-to-signal ratio are derived from the measured correlation of doublet in the received noise.

Calibrations are proposed to make the estimates sufficiently accurate over link attributes such as, for example, net chromatic dispersion, link length, and symbol error rate.

DETAILED DESCRIPTION

Coherent detection gives access to optical fields after transmission, and provides a new path for link monitoring. In particular, the properties of Kerr nonlinear noise can be exploited to allow separation of linear noise, and intra-channel and inter-channel nonlinearities at fixed power provisioning. Challenges include proposing a method to exploit the properties of Kerr nonlinear noise based on the received signal, obtaining sufficient measurement accuracy over the wide variety of link applications services, and measuring nonlinear noise with ongoing traffic (in service).

The Kerr effect is a third-order nonlinearity. Three fields (separated in time, or separated in frequency) interact to produce a fourth field. The Kerr effect is referred to as intra-channel Kerr nonlinear noise in cases where the three interacting fields are within a channel and the resulting fourth field is also within that same channel. The Kerr effect is referred to as inter-channel Kerr nonlinear noise in cases where the three interacting fields are between different channels (that is, one interacting field is from one channel and two interacting fields are from another channel, or each interacting field is from a different channel) and in cases where the three interacting fields are from one channel and the resulting fourth field is in a different channel.

Figure 1:
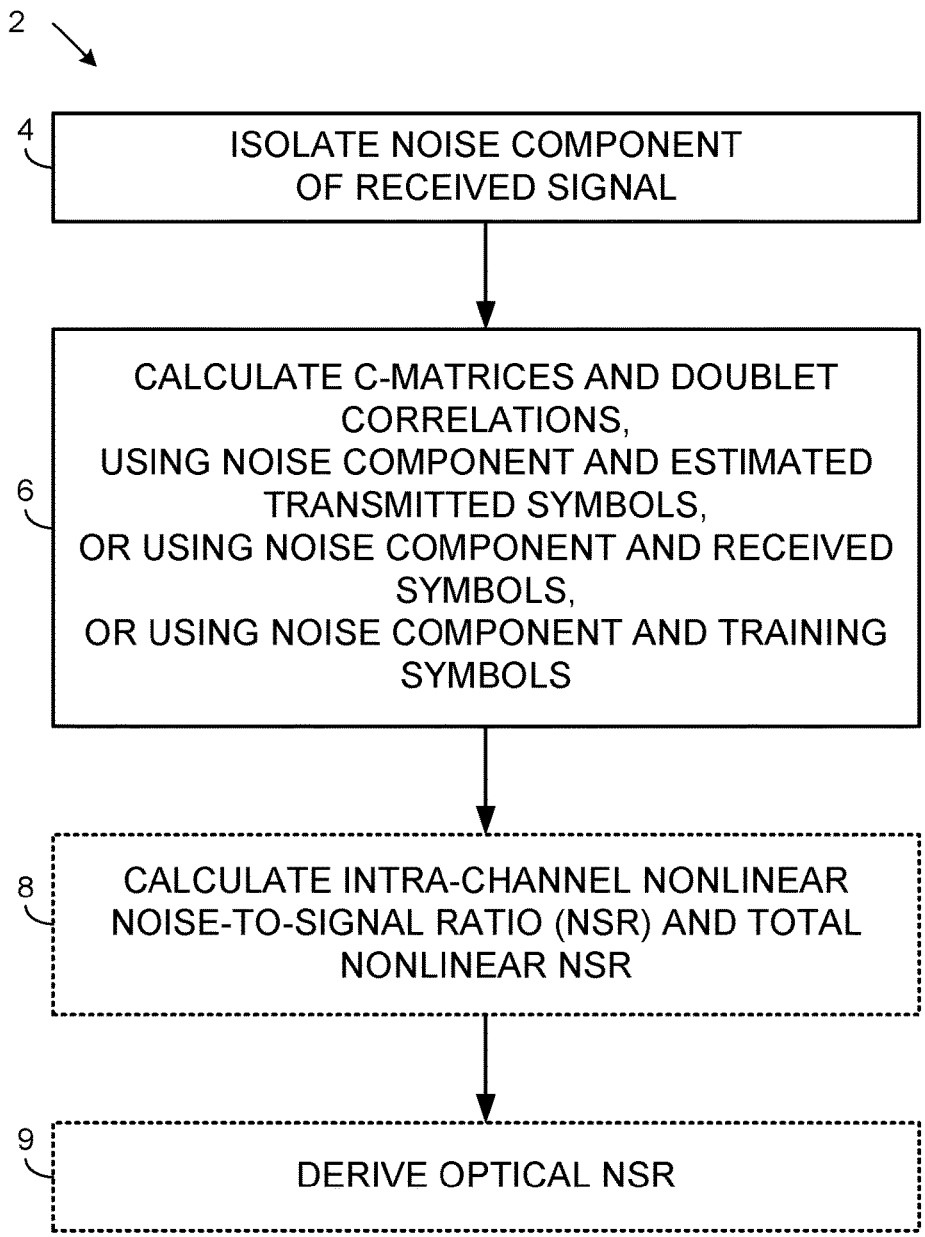
FIG. 1 illustrates a method for characterizing a channel.

FIG. 1 illustrates a method 2 for characterizing a channel and optionally, for determining nonlinear noise. At 4, a coherent optical receiver isolates a noise component of a received signal. As described in more detail below, the noise component may be isolated from the received symbols and estimated transmitted symbols, or from the received symbols and training symbols. At 6, the coherent optical receiver determines C-matrices and doublet correlations that characterize how the Kerr effect is manifested in a channel. The C-matrices and doublet correlations, which are described in more detail below, are determined using the nonlinear noise component that was isolated at 4, and using received symbols or training symbols or estimated transmitted symbols. As described in further detail below, various techniques may be employed to reduce the complexity of determining the C-matrices. Correction of systematic error is also described. Optionally, at 8, the coherent optical receiver uses the C-matrices and doublet correlations determined at 6 to calculate an estimated intra-channel noise-to-signal ratio (NSR) and to calculate a total nonlinear NSR. Optionally, at 9, the coherent optical receiver derives a linear NSR (also known as the optical NSR), for example, as the difference between the isolated noise and the total nonlinear NSR.

Isolation of the noise component assumes that nonlinear noise is a small perturbation of the otherwise linear transmit signal:

$$A' = A + \Delta A \tag{1}$$

where $A = [A_X, A_Y]^T$ is the dual-polarization transmitted signal, $A' = [A_X', A_Y']^T$ is the dual-polarization received signal, and $\Delta A = [\Delta A_X, \Delta A_Y]^T$ is the nonlinear noise component of the received signal. A, A', and $\Delta A$ are functions of time t and distance z. Other noise, including linear noise and transceiver internal noise, is ignored in equation (1).

Based on perturbation theory, the nonlinear Schrödinger equation can be expressed as $$\frac{\partial \Delta A}{\partial z} = \frac{i\beta_2}{2}\frac{\partial^2 \Delta A}{\partial t^2} + \frac{\alpha}{2}\Delta A = -i\gamma |A|^2 A \tag{2}$$

where $\beta_2$ is a second order dispersion coefficient, and $\alpha$ is an attenuation coefficient of the optical power.

Intra-Channel Kerr Nonlinear Noise

With dual-polarization signals (say, an X-polarization and a Y-polarization), an approximate solution of the intra-channel Kerr nonlinear noise component for each polarization can be derived based on equation (2) as $$\Delta A_X[k] = \sum_{m,n} C_X[m,n] A_X[k+m] A_X[k+n] A_X^*[k+m+n] + \sum_{m,n} C_{XY}[m,n] A_X[k+m] A_Y[k+n] A_Y^*[k+m+n] \tag{3}$$

$$\Delta A_Y[k] = \sum_{m,n} C_Y[m,n] A_Y[k+m] A_Y[k+n] A_Y^*[k+m+n] + \sum_{m,n} C_{YX}[m,n] A_Y[k+m] A_X[k+n] A_X^*[k+m+n] \tag{4}$$

where $\Delta A_X[k]$ is the nonlinear noise component indexed by k for the X-polarization, $\Delta A_Y[k]$ is the nonlinear noise component indexed by k for the Y-polarization, $A_X[k]$ is the transmitted symbol indexed by k for the X-polarization, $A_Y[k]$ is the transmitted symbol indexed by k for the Y-polarization, and the asterisk (*) denotes conjugation. $A_{X \text{ or } Y}[k]$ is a sampled version of $A_{X \text{ or } Y}$ in equations (1) and (2), and $\Delta A_{X \text{ or } Y}[k]$ is a sampled version of $\Delta A_{X \text{ or } Y}$ in equations (1) and (2).

As mentioned above, in the Kerr effect, three fields (separated in time, or separated in frequency) interact to produce a fourth field. Thus the summations in equations (3) and (4) involve triplets of symbols: a symbol indexed by k+m, a symbol indexed by k+n, and a symbol indexed by k+m+n. The triplet is represented by the shorthand (k,m,n, m+n).

In the time domain, the three interacting fields may be represented with $A[k] = A(k \cdot \Delta t)$ where $\Delta t$ is the sample duration, and the corresponding C-matrices may be in the time domain.

In the frequency domain, the three interacting fields may be represented with $A[k] = \tilde{A}(k \cdot \Delta f)$, where $\tilde{A}(f)$ is the Fourier transform of $A(t)$ and $\Delta f$ is the frequency spacing, and the corresponding C-matrices may be in the frequency domain.

In the symbol domain, the three interacting fields may be represented with with $A[k] = A(k \cdot T)$ where T denotes the symbol duration, and the corresponding C-matrices may be in the symbol domain.

The indices m and n can take on negative values, zero values and positive values. For example, the sequence $A_X[-2], A_X[-1], A_X[0], A_X[1], A_X[2]$ represents five consecutively transmitted symbols for the X polarization. The contribution of the nonlinear intra-channel interaction between $A_X[-1], A_X[1]$, and $A_X[2]$ to the intra-channel Kerr nonlinear noise for the X polarization, $\Delta A_X[0]$, is given by $C_X[-1,2]A_X[-1]A_X[2]A_X^*[1]$.

The coefficients $C_X[m,n]$, $C_Y[m,n]$, $C_{XY}[m,n]$, and $C_{YX}[m,n]$ appearing in equations (3) and (4) form four separate C-matrices $C_X$, $C_Y$, $C_{XY}$, and $C_{YX}$, respectively, that characterize how the Kerr effect is manifested in the channel over which the symbols have been transmitted and received. That is, the C-matrices $C_X$, $C_Y$, $C_{XY}$, and $C_{YX}$ characterize the fourth field that is produced by the Kerr effect. In the absence of polarization effects, the C-matrices $C_X$, $C_Y$, $C_{XY}$, and $C_{YX}$ are identical to each other.

Assuming the power of symbols is normalized, the C-matrices can be estimated by evaluating the cross-correlation between the intra-channel noise component and the fields of each (k,m,n,m+n) triplet, and taking into account the correlation between the triplets.

The C-matrices $C_X[m, n]$ and $C_{XY}[m, n]$ can be evaluated as follows:

$$C'_X[m,n] = E[\Delta A_X[k] \cdot A_X^*[k+m] \cdot A_X^*[k+n] \cdot A_X[k+m+n]] \tag{5}$$

$$C'_{XY}[m,n] = E[\Delta A_X[k] \cdot A_X^*[k+m] \cdot A_Y^*[k+n] \cdot A_Y[k+m+n]] \tag{6}$$

$$Q_X[k,m,n] = A_X[k+m] \cdot A_X[k+n] \cdot A_X^*[k+m+n] \tag{7}$$

$$Q_{XY}[k,m,n] = A_X[k+m] \cdot A_Y[k+n] \cdot A_Y^*[k+m+n] \tag{8}$$

$$\vec{C}'_X = \text{vec}(C'_X[m,n], C'_{XY}[m,n]) \tag{9}$$

$$\vec{Q}_X = \text{vec}(Q_X[k,m,n], Q_{XY}[k,m,n]) \tag{10}$$

$$R_X = E[\vec{Q}_X \vec{Q}_X^H] \tag{11}$$

$$\vec{C}_X = \vec{C}'_X \text{inv}(R_X) \tag{12}$$

$$(C_X[m,n], C_{XY}[m,n]) = \text{vec}^{-1}(\vec{C}_X) \tag{13}$$

where $\text{vec}(\cdot)$ is a function that converts the matrices to a single vector with a certain order of all elements, $\text{vec}^{-1}(\cdot)$ is the inverse operation of $\text{vec}(\cdot)$, and $\text{inv}(\cdot)$ is inverse of a matrix.

The C-matrices $C_Y[m, n]$ and $C_{YX}[m, n]$ can be evaluated as follows:

$$C'_Y[m,n] = E[\Delta A_Y[k] \cdot A_Y^*[k+m] \cdot A_Y^*[k+n] \cdot A_Y[k+m+n]] \tag{14}$$

$$C'_{YX}[m,n] = E[\Delta A_Y[k] \cdot A_Y^*[k+m] \cdot A_X^*[k+n] \cdot A_X[k+m+n]] \tag{15}$$

$$Q_Y[k,m,n] = A_Y[k+m] \cdot A_Y[k+n] \cdot A_Y^*[k+m+n] \tag{16}$$

$$Q_{YX}[k,m,n] = A_Y[k+m] \cdot A_X[k+n] \cdot A_X^*[k+m+n] \quad (17)$$

$$\vec{C}_Y' = \text{vec}(C_Y'[m,n], C_{YX}[m,n]) \quad (18)$$

$$\vec{Q}_Y = \text{vec}(Q_Y[k,m,n], Q_{YX}[k,m,n]) \quad (19)$$

$$R_Y = E[\vec{Q}_Y \vec{Q}_Y^H] \quad (20)$$

$$\vec{C}_Y = \vec{C}_Y' \text{inv}(R_Y) \quad (21)$$

$$(C_Y[m,n], C_{YX}[m,n]) = \text{vec}^{-1}(\vec{C}_Y) \quad (22)$$

where vec(•) is a function that convert the matrices to a single vector with a certain order of all elements, $\text{vec}^{-1}(\cdot)$ is the inverse operation of vec(•), and inv(•) is inverse of a matrix.

In equations (5), (6), (11), (14), (15) and (20), E is an expectation, which is a weighted average. In equations (3) through (22), the transmitted symbols can be replaced by the received symbols.

Note that $C_X[m, 0]$, $C_X[0, n]$, $C_{XY}[m, 0]$, $C_Y[m, 0]$, $C_Y[0, n]$, and $C_{YX}[m, 0]$ cannot be evaluated in this manner due to correlations between the various triplet terms. For example, $C_X[1,0]A_X[k]|A_X[k+1]|^2$ is correlated with $C_X[2,0]A_X[k]|A_X[k+2]|^2$ and it is not possible to separate $C_X[1,0]$ and $C_X[2,0]$ in the proposed calculations. Therefore, the coefficients $C_{XY}[0, n]$ and $C_{YX}[0, n]$ are used to approximate these 6 coefficients. The coefficients $C_X[0,0]$, $C_Y[0,0]$, $C_{XY}[0,0]$, and $C_{YX}[0,0]$ cannot be evaluated.

The intra-channel nonlinear noise-to-signal ratio (NSR), denoted in this document as NL-NSR$_{INTRA,X \text{ or } Y}$, may be calculated as:

$$\text{NL-NSR}_{INTRA,X} \approx E[\vec{C}_X^H \vec{Q}_X \vec{Q}_X^H \vec{C}_X] = \vec{C}_X^H E[\vec{Q}_X \vec{Q}_X^H] \vec{C}_X$$
$$\vec{C}_X = \vec{C}_X^H R_X \vec{C}_X \quad (23)$$

$$\text{NL-NSR}_{INTRA,Y} \approx E[\vec{C}_Y^H \vec{Q}_Y \vec{Q}_Y^H \vec{C}_Y] = \vec{C}_Y^H E[\vec{Q}_Y \vec{Q}_Y^H] \vec{C}_Y$$
$$\vec{C}_Y = \vec{C}_Y^H R_Y \vec{C}_Y \quad (24)$$

In equations (23) and (24), E is an expectation, which is a weighted average.

Total Kerr Nonlinear Noise

With dual-polarization signals (say, an X-polarization and a Y-polarization), the total Kerr nonlinear noise component—which includes both the intra-channel Kerr nonlinear noise component and the inter-channel Kerr nonlinear noise—can be approximated by:

$$\Delta A_X[k] \approx \quad (25)$$
$$\sum_{n=-N}^{N} A_X[k+n] \left\{ \sum_m C^{SPM}[m,n](A_X[k+m]A_X^*[k+m+n] + A_Y[k+m]A_Y^*[k+m+n]) + \sum_m C^{XPM}[m,n](2B_X[k+m]B_X^*[k+m+n] + B_Y[k+m]B_Y^*[k+m+n]) \right\} +$$
$$\sum_{n=-N}^{N} A_Y[k+n] \sum_m C^{XPM}[m,n] B_X[k+m]B_Y^*[k+m+n]$$

$$\Delta A_Y[k] \approx \quad (26)$$
$$\sum_{n=-N}^{N} A_Y[k+n] \left\{ \sum_m C^{SPM}[m,n](A_Y[k+m]A_Y^*[k+m+n] + A_X[k+m]A_X^*[k+m+n]) + \sum_m C^{XPM}[m,n](2B_Y[k+m]B_Y^*[k+m+n] + B_X[k+m]B_X^*[k+m+n]) \right\} +$$
$$\sum_{n=-N}^{N} A_X[k+n] \sum_m C^{XPM}[m,n] B_Y[k+m]B_X^*[k+m+n]$$

where $\Delta A_X[k]$ is the total nonlinear noise component indexed by k for the X-polarization in the channel, $\Delta A_Y[k]$ is the total nonlinear noise component indexed by k for the Y-polarization in the channel, $A_X[k]$ is the transmitted symbol indexed by k for the X-polarization in the channel, $A_Y[k]$ is the transmitted symbol indexed by k for the Y-polarization in the channel, $B_X[k]$ is the transmitted symbol indexed by k for the X-polarization in a different channel, $B_Y[k]$ is the transmitted symbol indexed by k for the Y-polarization in the different channel, and the asterisk (*) denotes conjugation.

For each polarization, the following doublets are correlated over k:

$\sum_m C^{SPM}[m, n](A_X[k+m]A_X^*[k+m+n]+A_Y[k+m]A_Y^*[k+m+n])$ in equation (25);

$\sum_m C^{XPM}[m, n](2B_X[k+m]B_X^*[k+m+n]+B_Y[k+m]B_Y^*[k+m+n])$ in equation (25);

$\sum_m C^{XPM}[m, n]B_X[k+m]B_Y^*[k+m+n]$ in equation (25); and $\sum_m C^{SPM}[m, n](A_Y[k+m]A_Y^*[k+m+n]+A_X[k+m]A_X^*[k+m+n])$ in equation (26);

$\sum_m C^{XPM}[m, n](2B_Y[k+m]B_Y^*[k+m+n]+B_X[k+m]B_X^*[k+m+n])$ in equation (26);

$\sum_m C^{XPM}[m, n]B_Y[k+m]B_X^*[k+m+n]$ in equation (26).

Moreover, the doublet across two polarizations is partially correlated. These correlations can be exploited to estimate the total Kerr nonlinearities even though the symbols of the channels B are not accessible.

In equations (25) and (26), one can focus on the intra-polarization correlation (the C-matrix $C^{SPM}$) or on the cross-polarization correlation (the C-matrix $C^{XPM}$) or on both correlations. In general, the correlations of the doublet can be substituted by the expressions $\Delta A_Y[k]/A_X[k+n]$ and $\Delta A_X[k]/A_Y[k+n]$, respectively. These correlations can be used to estimate the total Kerr nonlinear noise-to-signal ratio. For example, assuming transmitted symbols are uncorrelated and normalized, the following is an example formulation for an approximation of the total Kerr nonlinear noise-to-signal ratio, denoted in this document as NL-NSR$_{TOTAL}$:

$$\text{NL-NSR}_{TOTAL} \approx \sum_{n=-N}^{N} p(n) \quad (27)$$

$$p(0) = E[\Delta A_X[k]A_X^*[k] \cdot \Delta A_Y[k]A_X^*[k]] \quad (28)$$

$$p(n) = E[\Delta A_X[k]A_X^*[k+n] \cdot \Delta A_Y[k]A_Y^*[k+n]], \text{ for } n \neq 0 \quad (29)$$

where N denotes the symbol delay in the estimation, which is related to estimation accuracy and time. For a link with a long memory, that is, with high net chromatic dispersion, a large N should be used in principle. In equations (28) and (29), E is an expectation, which is a weighted average.

The following is a summary of doublet correlations that can be derived based on equation (25) and equation (26). These doublet correlations can be used to estimate the total Kerr nonlinear noise-to-signal ratio. The correlations between transmitted symbols should also be included, if they exist. Any one or more of the doublet correlations and the symbol correlations can be used as the input to machine learning functions (e.g. a neural network) to obtain the estimate of the nonlinear noise-to-signal ratio or other related system parameters.

Intra-Polarization Doublet Correlation for the X-Polarization $$p1_X(n, i) = E\left[\frac{\Delta A_X[k]}{A_X[k+n]} \cdot \frac{\Delta A_X[k+n+i]}{A_X[k+i]}\right] \quad (30)$$

$$p2_X(n, i) = E[\Delta A_X[k]A_X^*[k+n] \cdot \Delta A_X[k+n+i]A_X^*[k+i]] \quad (31)$$

$$p3_X(n, i) = E\left[\frac{\Delta A_X[k]}{A_X[k+n]} \cdot \frac{\Delta A_X^*[k+i]}{A_X^*[k+n+i]}\right], i \neq 0 \quad (32)$$

$$p4_X(n, i) = E[\Delta A_X[k]A_X^*[k+n] \cdot \Delta A_X^*[k+i]A_X[k+n+i]], i \neq 0 \quad (33)$$

Intra-Polarization Doublet Correlation for the Y-Polarization $$p1_Y(n, i) = E\left[\frac{\Delta A_Y[k]}{A_Y[k+n]} \cdot \frac{\Delta A_Y[k+n+i]}{A_Y[k+i]}\right] \quad (34)$$

$$p2_Y(n, i) = E[\Delta A_Y[k]A_Y^*[k+n] \cdot \Delta A_Y[k+n+i]A_Y^*[k+i]] \quad (35)$$

$$p3_Y(n, i) = E\left[\frac{\Delta A_Y[k]}{A_Y[k+n]} \cdot \frac{\Delta A_Y^*[k+i]}{A_Y^*[k+n+i]}\right], i \neq 0 \quad (36)$$

$$p4_Y(n, i) = E[\Delta A_Y[k]A_Y^*[k+n] \cdot \Delta A_Y^*[k+i]A_Y[k+n+i]], i \neq 0 \quad (37)$$

Cross-Polarization Doublet Correlation $$p5(n, i) = E\left[\frac{\Delta A_X[k]}{A_X[k+n]} \cdot \frac{\Delta A_Y^*[k+i]}{A_Y^*[k+n+i]}\right] \quad (38)$$

$$p6(n, i) = E[\Delta A_X[k]A_X^*[k+n] \cdot \Delta A_Y^*[k+i]A_Y[k+n+i]] \quad (39)$$

$$p7(n, i) = E\left[\frac{\Delta A_X[k]}{A_X[k+n]} \cdot \frac{\Delta A_Y[k+n+i]}{A_Y[k+i]}\right] \quad (40)$$

$$p8(n, i) = E[\Delta A_X[k]A_X^*[k+n] \cdot \Delta A_Y[k+n+i]A_Y^*[k+i]] \quad (41)$$

$$p9(n, i) = E\left[\frac{\Delta A_X[k]}{A_Y[k+n]} \cdot \frac{\Delta A_Y[k+n+i]}{A_X[k+i]}\right] \quad (42)$$

$$p10(n, i) = E[\Delta A_X[k]A_Y^*[k+n] \cdot \Delta A_Y[k+n+i]A_X^*[k+i]] \quad (43)$$

$$p11_X(n, i) = E\left[\frac{\Delta A_X[k]}{A_Y[k+n]} \cdot \frac{\Delta A_X^*[k+i]}{A_Y^*[k+n+i]}\right], i \neq 0 \quad (44)$$

$$p12_X(n, i) = E[\Delta A_X[k]A_Y^*[k+n] \cdot \Delta A_X^*[k+i]A_Y[k+n+i]], i \neq 0 \quad (45)$$

$$p11_Y(n, i) = E\left[\frac{\Delta A_Y[k]}{A_X[k+n]} \cdot \frac{\Delta A_Y^*[k+i]}{A_X^*[k+n+i]}\right], i \neq 0 \quad (46)$$

$$p12_Y(n, i) = E[\Delta A_Y[k]A_X^*[k+n] \cdot \Delta A_Y^*[k+i]A_X[k+n+i]], i \neq 0 \quad (47)$$

In equations (30) through (47), E is an expectation, which is a weighted average. In equations (30) through (47), the transmitted symbols can be replaced by the received symbols.

Figure 2:
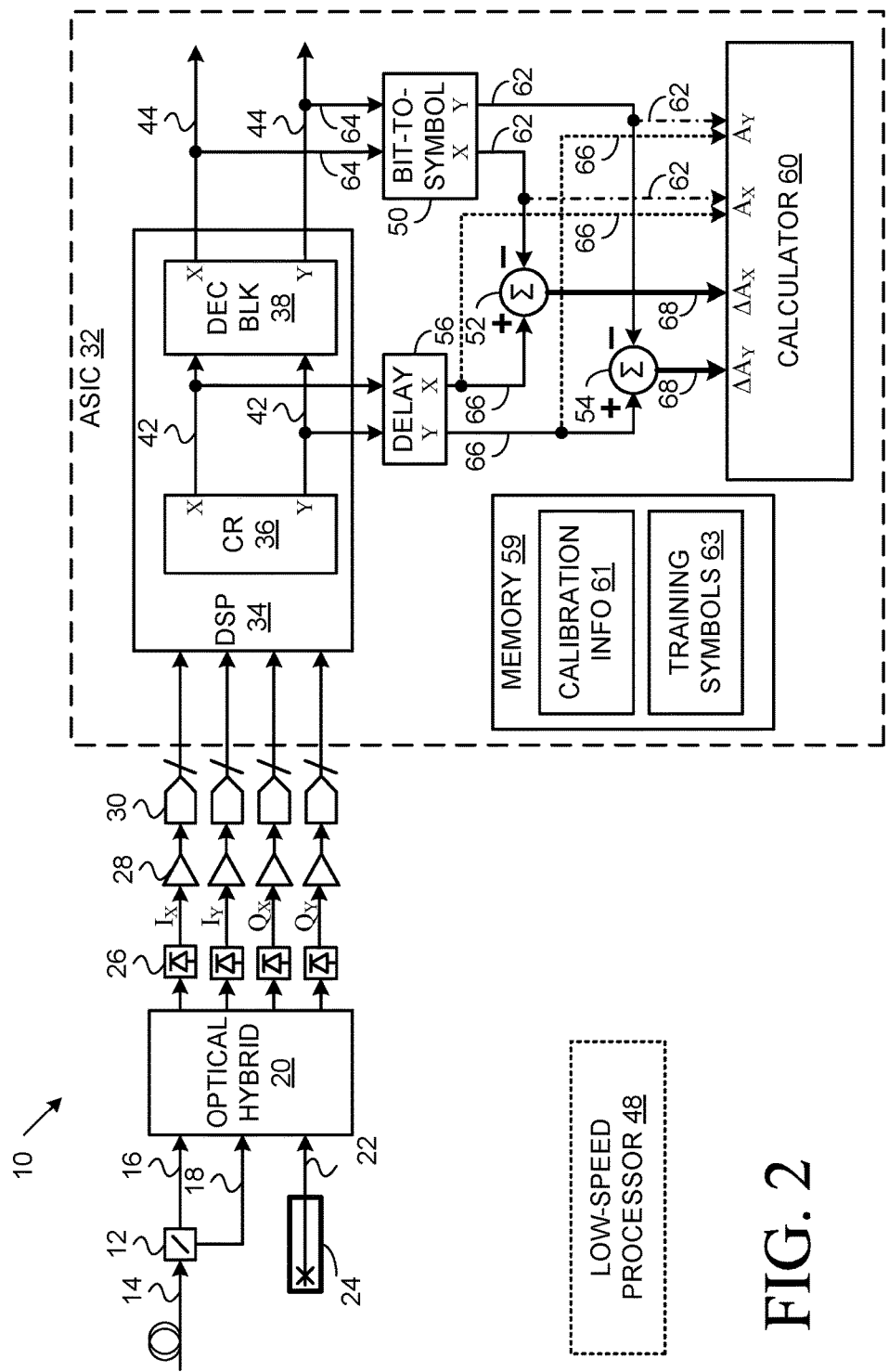
FIG. 2 illustrates an example coherent receiver.

FIG. 2 illustrates an example coherent optical receiver 10. A polarizing beam splitter 12 is operative to split a received optical signal 14 into orthogonally-polarized components 16, 18. An optical hybrid 20 is operative to process the orthogonally-polarized components 16, 18 with respect to a reference optical signal 22 produced by a laser 24. Photodetectors 26 are operative to convert the output of the optical hybrid 20 to electrical signals corresponding to the in-phase (I) and quadrature (Q) components on both polarizations (say, an X-polarization and a Y-polarization). Amplifiers 28 are operative to amplify the electrical signals, and analog-to-digital converters (ADCs) 30 are operative to sample the amplified electrical signals.

An application specific integrated circuit (ASIC) 32 comprises components to process the output of the ADCs 30 to recover the data that was transmitted. The ASIC 32 comprises a digital signal processor (DSP) 34.

The DSP 34 is operative to process the output of the ADCs 30 to perform dispersion compensation, polarization compensation, clock recovery, carrier recovery, symbol decoding, and so forth.

A carrier recovery module 36 implemented by the DSP 34 is operative to track and remove the phase noise from both the transmit laser (not shown) and the laser 24 so as to produce digital representations 42 of analog received symbols (also referred to as "received waveforms") for the X polarization and Y polarization. Each received symbol, and hence its digital representation, is composed of the true transmitted symbol and a noise component. The true transmitted symbol is the symbol modulated onto a polarized component of an optical carrier at a transmitter, the modulated optical carrier being sent over a channel to the coherent optical receiver 10, where it is received as the received optical signal 14.

A decision block 38 implemented by the DSP 34 is operative to output decisions 44 regarding the received symbols for the X polarization and Y polarization. In cases where the decision block 38 implements a hard decision, each decision 44 output by the decision block 38 is a set of bits representing an estimated transmitted symbol. The estimated transmitted symbol includes some error with respect to the true transmitted symbol. Over time, there might be more than 10% of the estimated transmitted symbols that are erroneous, that is, not identical to the true transmitted symbol. In cases where the decision block 38 implements a soft decision, the most significant bit (MSB) of each soft decision output by the decision block 38 is part of the string of bits that is converted to the estimated transmitted symbol.

The example coherent optical receiver 10 differs from conventional coherent optical receivers in that it comprises additional functionality to enable calculation of nonlinear noise-to-signal ratio. The remaining discussion of FIG. 2 describes this additional functionality as being implemented in the ASIC 32. In an alternative implementation, this additional functionality—or a portion thereof—is implemented in a low-speed processor 48 that is operatively coupled to the ASIC 32. The low-speed processor 48 is illustrated as an optional component of the example coherent optical receiver 10.

To enable calculation of nonlinear noise-to-signal ratio, the ASIC 32 may comprise a bit-to-symbol converter 50, subtraction elements 52, 54, a delay element 56, and a nonlinear noise-to-signal ratio (NSR) calculator 60. The subtraction element 52 is for the X-polarization, and the subtraction element 54 is for the Y-polarization. The nonlinear NSR calculator 60 has access to calibration information 61, as described in further detail below. The nonlinear NSR calculator 60 may also have access to training symbols 63, as described in further detail below. The calibration information 60 and, if present, the training symbols 63, may be stored in a memory 59. The nonlinear NSR calculator 60 may be implemented in software (also stored in the memory 59) or in firmware or in hardware or in any combination thereof.

The bit-to-symbol converter 50 is operative to convert a set of bits into a digital representation 62 of an analog pristine symbol with no noise. The bit-to-symbol converter 50 receives, for each polarization, an input 64 that is the set of bits representing an estimated transmitted symbol (because the set of bits are a hard decision or the MSBs of a soft decision), and the digital representation 62 is of an analog pristine symbol identical to the estimated transmitted symbol with no noise.

Each of the subtraction elements 52, 54 is operative to subtract the digital representation 62 of the analog pristine symbol with no noise from a delayed version 66 of the digital representation 42 of the analog received symbol. The delay element 56 is operative to delay the digital representation 42 of the analog received symbol to yield the delayed version 66, so that the subtraction element 52, 54 effects a comparison of the analog received symbol corresponding to a particular instant in time to an estimated transmitted symbol from the same instant in time. The output of the subtraction element 52, 54 is a digital representation 68 of a noise component in the analog received symbol.

The subtraction by the subtraction element 52 can be represented as $\Delta A_X[k]=R_X[k]-A_X[k]$, and the subtraction by the subtraction element 54 can be represented as $\Delta A_Y[k]=R_Y[k]-A_Y[k]$, where $R_X[k]$ and $R_Y[k]$ are the digital representations of the received symbol indexed by k for the X-polarization and for the Y-polarization, respectively.

In the implementation where the input 64 to the bit-to-symbol converter 50 is the set of bits representing an estimated transmitted symbol, $A_X[k]$ and $A_Y[k]$ are the digital representations of the estimated transmitted symbol indexed by k for the X-polarization and for the Y-polarization, respectively, and $\Delta A_X[k]$ and $\Delta A_Y[k]$ are digital representations of the estimated noise component of the analog received symbol indexed by k for the X-polarization and for the Y-polarization, respectively.

The nonlinear NSR calculator 60 is operative to perform nonlinear noise-to-signal ratio calculations based on its input. The nonlinear NSR calculator 60 receives as input, for the X-polarization and for the Y-polarization, the digital representations 68 of the noise component in the analog received symbol. The nonlinear NSR calculator 60 may also receive as input, for the X-polarization and for the Y-polarization, either the digital representation 58 of the analog pristine symbol (the estimated transmitted symbol) with no noise or the delayed version 66 of the digital representation 42 of the analog received symbol.

The nonlinear NSR calculator 60 is operative to provide a measure or estimate of intra-channel Kerr nonlinear noise-to-signal ratio and a measure or estimate of total Kerr nonlinear noise-to-signal ratio. The intra-channel Kerr nonlinear noise-to-signal ratio is derived from measured triplet coefficients in the received noise. The total Kerr nonlinear noise-to-signal ratio is derived from doublet correlations in the received noise.

With respect to the intra-channel Kerr nonlinear noise-to-signal ratio, the nonlinear NSR calculator 60 may evaluate the C-matrices $C_X$ and $C_{XY}$ according to equations (5) to (13), and the C-matrices $C_Y$ and $C_{YX}$ according to equations (14) to (22). In some implementations, the nonlinear NSR calculator 60 may calculate NL-$NSR_{INTRA,X\,or\,Y}$ according to equations (23) and (24).

With respect to the total Kerr nonlinear noise-to-signal ratio, the nonlinear NSR calculator 60 may evaluate NL-$NSR_{TOTAL}$ according to equations (27) to (29).

The previous discussion shows how the noise component is isolated from the received symbols and the estimated transmitted symbols. In an alternative implementation, the noise component is isolated from the received symbols and training symbols, where the training symbols 63 are substituted for the digital representation 62 of the analog pristine symbol with no noise.

The previous discussion shows how coefficients of the C-matrices are evaluated from the isolated noise component and the fields of a triplet of received symbols or estimated transmitted symbols. In an alternative implementation, the training symbols 63 are substituted for the received symbols or for the estimated transmitted symbols in the calculations.

The previous discussion shows how doublet correlations are evaluated from the product or quotient of the isolated noise component and the field of a received symbol or of an estimated transmitted symbol. In an alternative implementation, the training symbols 63 are substituted for the received symbols or for the estimated transmitted symbols in the calculations.

Implementation Considerations

Various techniques, alone or in combination, may be employed by the nonlinear NSR calculator 60, to increase the accuracy of the calculations, or to reduce the complexity of the calculations, or to reduce the number of calculations. Such techniques include exploitation of symmetry, limiting the range of values for the indices m and n over which the coefficients are evaluated, interpolation, truncation, and using machine learning techniques to extract information from fewer inputs.

Reduced-complexity implementations for determining C-matrices are proposed. For example, inter-channel noise may be ignored. In an alternative example, when considering inter-channel noise, only nearest neighbor channels may be included, and other channels may be ignored.

Symmetry

The extent of the Kerr effect is related to the memory of the channel, and the values for the indices m and n that are considered in the summation relate to the memory accounted for in the calculations. As mentioned above, the indices m and n in equations (5) to (22) can take on negative values, zero values and positive values. Symmetry may be exploited, to reduce the number of coefficients that are evaluated, or to increase accuracy by averaging over symmetric coefficients, or both. For example, the C-matrices $C_X$, $C_Y$, $C_{XY}$, and $C_{YX}$ could be calculated only for positive values of the indices m and n, relying on symmetry of the quadrants to determine the coefficients for the other quadrants. In another example, averaging could be evaluated as follows, where C could be any one of the C-matrices $C_X$, $C_Y$, $C_{XY}$, and $C_{YX}$:

$$C'[m,n] = \frac{1}{4}(C[m,n] + C[-m,n] + C[m,-n] + C[-m,-n]), \quad (48)$$
$$\text{for } m>0, n>0$$

$$C'[0,n] = \frac{1}{2}(C[0,n] + C[0,-n]), \text{ for } n>0 \quad (49)$$

For the C-matrices $C_X$ and $C_{YX}$ a further symmetry can be exploited to increase accuracy:

$$C''[m, n] = \frac{1}{2}(C'[m, n] + C'[n, m]), \text{ for } m > 0, n > 0 \quad (50)$$

Limited Range of Values for Indices

The extent of the Kerr effect is related to the memory of the channel. The memory of the channel is determined by factors such as dispersion, link length, and signal bandwidth. When the symbols and coefficients are indexed by absolute time units, then as the baud increases the number of symbols to be included in the summations has to increase, because the number of symbols in a particular time span has increased. As the baud increases, the spectral extent of the channel increases, and through dispersion, the amount of spread in time increases. So the memory of the channel, when indexed or measured in absolute time units, goes roughly as the baud squared.

In some cases, it may be sufficient to consider m and n values in the range of −10 through +10. In other cases, it may be prudent to consider m and n values in the range of −100 through +100, or in the range of −200 through +200.

Figure 3:
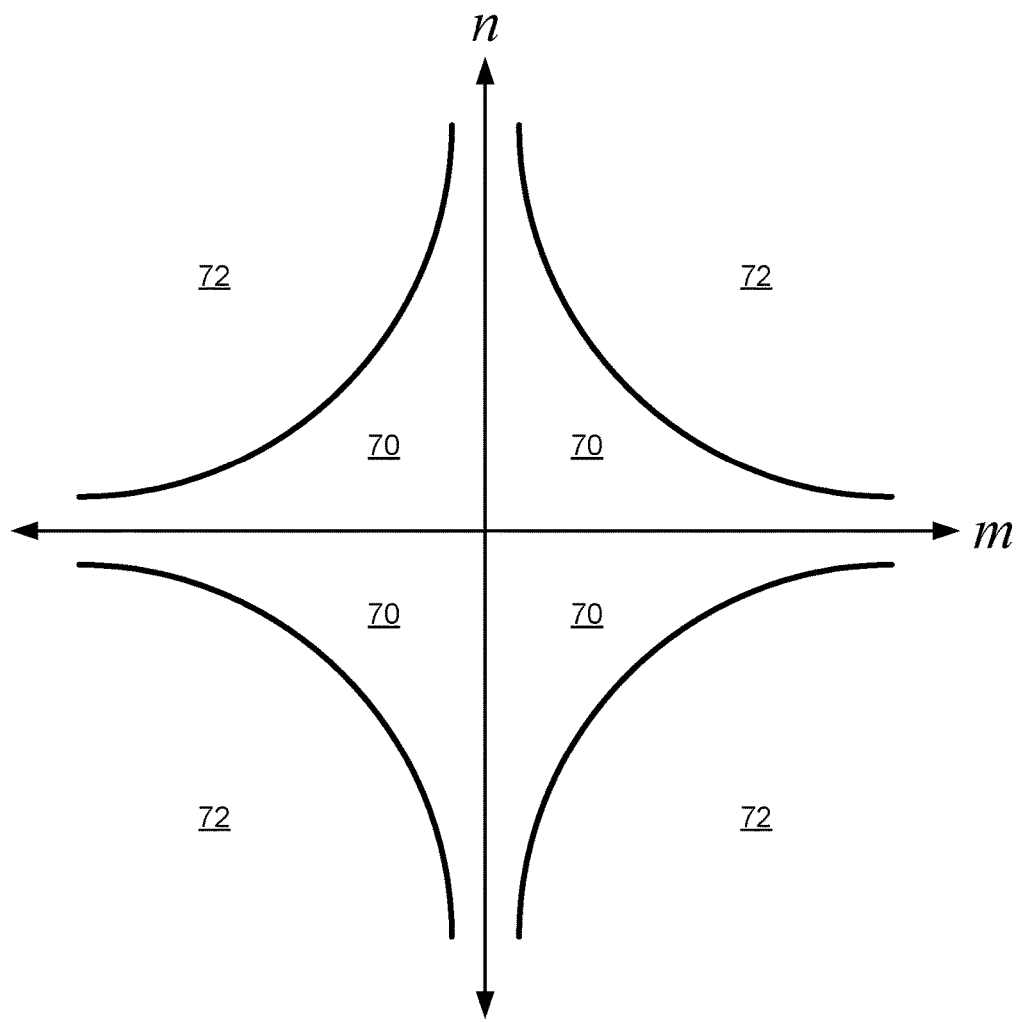
FIG. 3 illustrates a graph of indices for which C-matrix coefficients are of interest.

FIG. 3 illustrates a Cartesian graph with axes labeled m and n. An interior area 70 indicates the values of m and n for which the C-matrix coefficients are of interest. That is, one can ignore C-matrix coefficients C[m,n] for values of m,n that are not within the interior area 70, but are within the remaining areas 72.

If a channel employs frequency division multiplexing (FDM), then although the channel as a whole may have a wide spectral extent, the effective baud that has to be contended with within a given C-matrix has been reduced, and separate C-matrices may be determined on a per-division basis.

Interpolation

In many cases, more than ten thousand C-matrix coefficients are required for each the C-matrices $C_X$, $C_Y$, $C_{XY}$, and $C_{YX}$ to obtain a relatively accurate estimation of NL-NSR$_{INTRA,X \text{ or } Y}$. However, computation of so many C-matrix coefficients might take too long, based on hardware that is currently available.

For example, assuming the triplets are uncorrelated, NL-NSR$_{INTRA,X \text{ or } Y}$ can be calculated based on the power of the coefficients in the C-matrices. For each index m we can define $$P_X[m] = 8 \sum_{n>0, m \neq n} |C_X[m, n]|^2 + 4|C_X[m, m]|^2 + 4\sum_{n>0} |C_{XY}[m, n]|^2, \quad (51)$$
$$m > 0$$

$$P_X[0] = 2\sum_{n>0} |C_{XY}[n, 0]|^2 \quad (52)$$

$$P_Y[m] = 8 \sum_{n>0, m \neq n} |C_Y[m, n]|^2 + 4|C_Y[m, m]|^2 + 4\sum_{n>0} |C_{YX}[m, n]|^2, \quad (53)$$
$$m > 0$$

$$P_Y[0] = 2\sum_{n>0} |C_{YX}[n, 0]|^2 \quad (54)$$

$$NL\text{-}SNR_X[m] = \sum_{m \geq 0} P_X[m] \quad (55)$$

$$NL\text{-}SNR_Y[m] = \sum_{m \geq 0} P_Y[m] \quad (56)$$

In one example, the quantity $P_X[m]$ (equations (51) and (52)) or the quantity $P_Y[m]$ (equations (53) and (54)) may be evaluated for the index m belonging to the set {0, 1, 2, 3, 4, 6, 9, 19, 29, 49, 69, 99, 129, 159, 199}. The values of the C-matrix coefficients are expected to be very small when the index m is large. Therefore more precision is used for small values of the index m than for large values of the index m. When m=0 the summation is from n=1 to n=150. When m=1, the summation is from n=1 to n=100. When m=2, the summation is from n=1 to n=90. When m=3, the summation is from n=1 to n=80. When m=4, the summation is from n=1 to n=70. When m=6, the summation is from n=1 to n=60. And when m is equal to any other value in the set above, the summation is from n=1 to n=50. The values of the quantity $P_X[m]$ or the quantity $P_Y[m]$ for other values of the index m∈[0,199] may be obtained by simple linear interpolation. This example involves approximately four thousand C-matrix coefficients for each of the C-matrices $C_X$, $C_Y$, $C_{XY}$, and $C_{YX}$, compared to the ten thousand C-matrix coefficients mentioned above.

Calibration

There are errors inherent in some of the calculations performed by the nonlinear NSR calculator 60. The errors may be due to one or more of the following factors: the model being an approximation of the actual nonlinearity, the use of estimated transmitted symbols rather than true transmitted symbols to determine the C-matrices, the use of techniques to reduce computation complexity, the use of interpolation, and simplifications in the equations (for example, focusing on the cross-polarization correlation (the C-matrix $C^{XPM}$) in equations (25) and (26)). Calibration techniques are employed by the nonlinear NSR calculator 60 to reduce the errors and improve accuracy.

Figure 4:
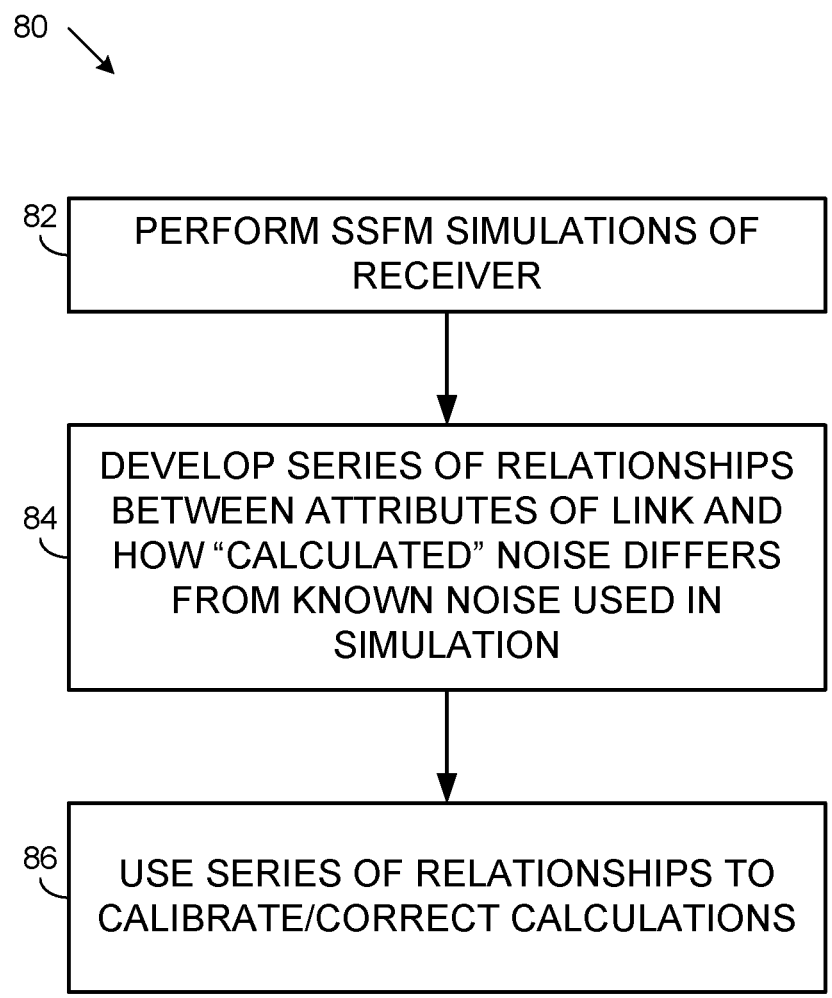
FIG. 4 illustrates a method of determining and using calibration information.

FIG. 4 illustrates a method 80 for developing and using calibration information. Calibration information 61 used by the nonlinear NSR calculator 60 is an example of calibration to be developed and used according to the method 80.

An application is defined as a particular configuration of an optical communication system, characterized by fiber type, distance between transmitter and receiver, line chromatic dispersion compensation (CDC) ratio, number of wavelength-division multiplexing (WDM) channels, and the launch power of the signal.

For example, the following applications were considered, for 56.8 Gbaud signals with 62.5 GHz spacing:

TABLE 1

Applications for systematic error study

| Fiber Type | Distance (km) | Line CDC ratio | WDM CHs | Power (dBm) 0% CDC | Power (dBm) 90% CDC |
|---|---|---|---|---|---|
| NDSF | 320, 640, 1200, 2000, 3200 | 0%, 90% | 1, 3, 5, 7 | −1.5, 0.5, 2.5 | −4, −2, 0 |
| TWC | 320, 640, 1200, 2000, 3200 | 0%, 90% | 1, 3, 5, 7 | −4.5, −2.5, −0.5 | −6, −4, −2 |
| ELEAF | 320, 640, 1200, 2000, 3200 | 0%, 90% | 1, 3, 5, 7 | −3, −1, 1 | −5, −3, −1 |

TABLE 1-continued

Applications for systematic error study

| Fiber Type | Distance (km) | Line CDC ratio | WDM CHs | Power (dBm) 0% CDC | Power (dBm) 90% CDC |
|---|---|---|---|---|---|
| NDSF & TWC | 320, 640, 1200, 2000, 3200 | 0%, 90% | 1, 3, 5, 7 | −3, −1, 1 | −5, −3, −1 |
| NDSF & ELEAF | 320, 640, 1200, 2000, 3200 | 0%, 90% | 1, 3, 5, 7 | −2.5, −0.5, 1.5 | −4.5, −2.5, −0.5 |
| ELEAF & TWC | 320, 640, 1200, 2000, 3200 | 0%, 90% | 1, 3, 5, 7 | −4, −2, 0 | −5.5, −3.5, −1.5 |

Split-step Fourier method (SSFM) simulations are performed at 82. Each simulation of a particular application (see Table 1 above) involves known transmitted symbols, known nonlinear inter-channel Kerr noise and known nonlinear intra-channel Kerr noise. A coherent optical receiver that implements the method 2 described with respect to FIG. 1 and FIG. 2 is simulated. The simulated coherent optical receiver isolates a noise component of a received signal or symbol, calculates C-matrices using the isolated noise component and either an estimated transmitted symbol or the known transmitted symbol, and, optionally, calculates a nonlinear contribution to the total NSR. The calculated nonlinear contribution to the total NSR can be compared to the known noise used in the simulation.

By performing the simulations over different applications (see Table 1 above), one can develop at 84 a series of relationships between attributes of the link (such as, for example, net chromatic dispersion along the link, the link length or distance, fiber type, span length, WDM configuration, etc.) and how the calculated nonlinear contribution to the total NSR differs from the known noise used in the simulation. The calibration information 61 is based on the series of relationships.

In one implementation, the relationships are polynomials, developing the relationships involves determining coefficients of the polynomials using known fitting techniques, and the calibration information 61 includes the polynomials, their determined coefficients, and one or more attributes of the link. In another implementation, the relationships are developed using neural networks, and the calibration information 61 includes a trained neural network and optionally one or more attributes of the link.

At 86, the nonlinear NSR calculator 60 uses the calibration information 61 based on the series of relationships developed at 84 to calibrate or correct the calculation of the C-matrices (or to calibrate or correct the calculation of the nonlinear contribution to total NSR).

Figure 5:
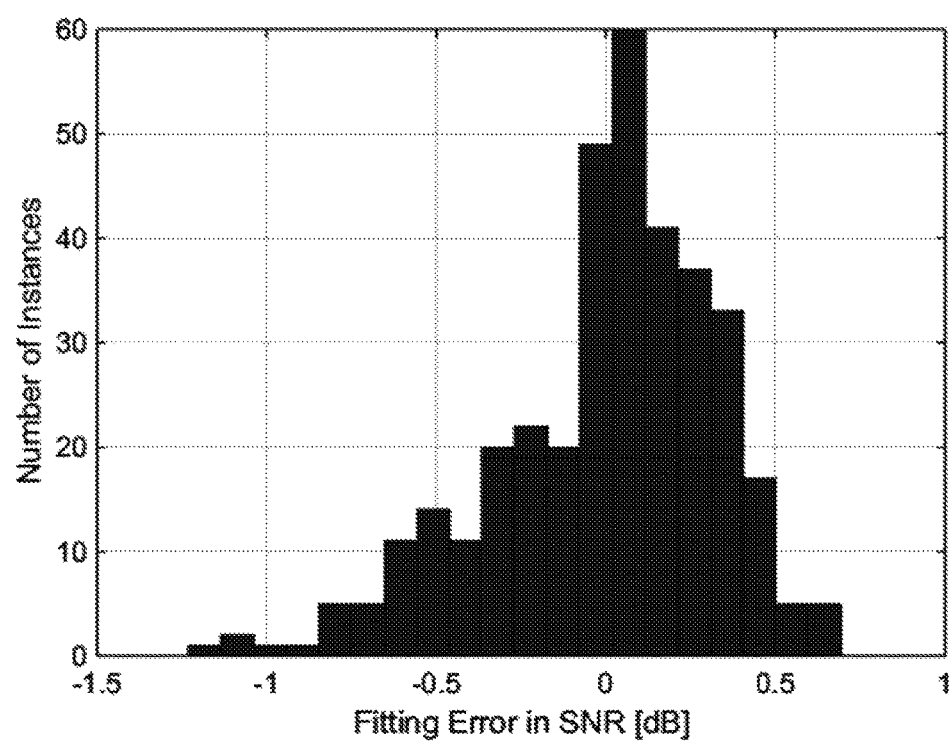
FIG. 5, FIG. 6, FIG. 7, and FIG. 8 illustrate fitting errors in Signal to Noise Ratio (SNR) for various Quadrature Phase Shift Keying (QPSK) modulation simulations regarding intra-channel Kerr noise.

Calibration of Intra-Channel Kerr Nonlinear Noise-to-Signal Ratio Using Polynomials QPSK (Quadrature Phase Shift Keying) Examples Simulations were performed for applications with QPSK modulation. Using net chromatic dispersion only to fit the results of the simulations using a second order polynomial regression as $$\varepsilon = c_0 + c_1 \cdot x + c_2 \cdot x^2 \quad (57)$$

where $\varepsilon$ is the offset in dB, $x = \log_{10}$ (net chromatic dispersion in ps/nm), and the coefficients obtained were $c_0 = 7.029$, $c_1 = -3.343$, and $c_2 = 0.472$ with a root mean square error (RMSE) of 0.3008 dB. The fitting error in SNR (dB) is illustrated in FIG. 5.

Figure 6:
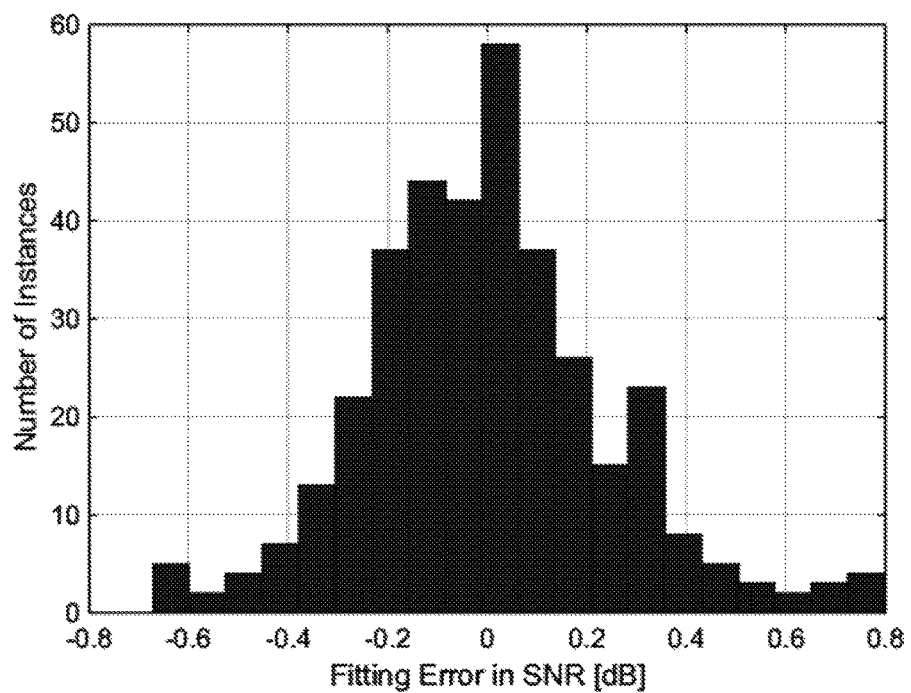

Using both net chromatic dispersion and link length to fit the results as $$\varepsilon = c_0 + c_1 \cdot x + c_2 \cdot y + c_3 \cdot x^2 + c_4 \cdot xy + c_5 \cdot y^2 \quad (58)$$

where $\varepsilon$ is the offset in dB, $x = \log_{10}$ (net chromatic dispersion in ps/nm), $y = $[net chromatic dispersion in ps/nm]/[link length in km], and the coefficients obtained were $c_0 = 6.438$, $c_1 = -2.695$, $c_2 = 0.08515$, $c_3 = 0.294$, $c_4 = 0.03263$, and $c_5 = -0.009783$ with a root mean square error (RMSE) of 0.2255 dB. The fitting error in SNR (dB) is illustrated in FIG. 6.

Figure 7:
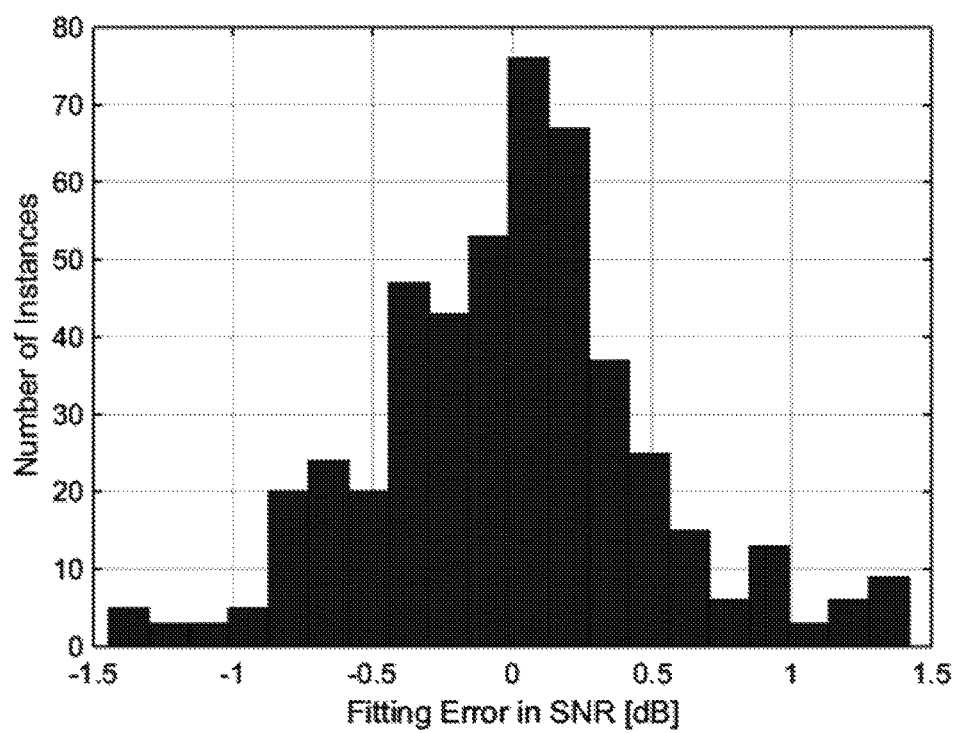

Even with reduced complexity, calibration information can be determined. For example, evaluating the quantity $P_{X\ or\ Y}[0]$ given in equation (52) or (54) above with a half-width of 10 symbols yields the following fitting results with net chromatic dispersion and link length: $c_0 = 32.0806$, $c_1 = -19.8526$, $c_2 = 1.1470$, $c_3 = 3.4696$, $c_4 = -0.2033$, and $c_5 = -0.0124$ with a root mean square error (RMSE) of 0.5026 dB. The fitting error in SNR (dB) is illustrated in FIG. 7.

Figure 8:
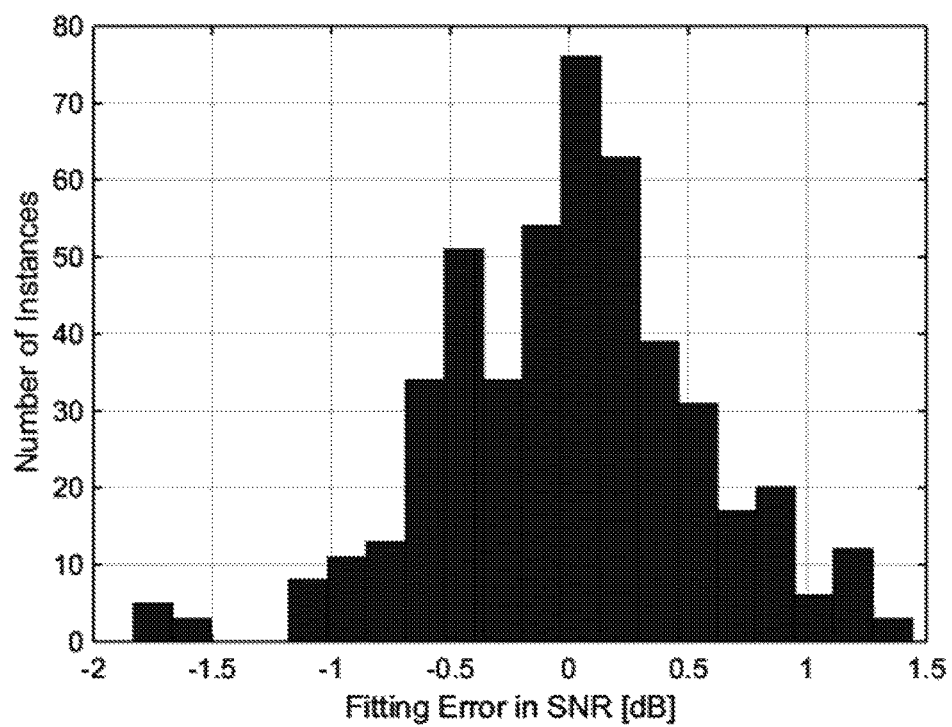

Similarly, evaluating the quantity $P_{X\ or\ Y}[m]$ given in equation (51) or (53) above for m=1 with a half-width of 20 symbols yields the following fitting results with net chromatic dispersion and link length: $c_0 = 14.5311$, $c_1 = -4.4661$, $c_2 = 0.6968$, $c_3 = 0.3787$, $c_4 = 0.0399$, and $c_5 = -0.0352$ with a root mean square error (RMSE) of 0.5478 dB. The fitting error in SNR (dB) is illustrated in FIG. 8.

16QAM (16 Quadrature Amplitude Modulation) Examples

Figure 9:
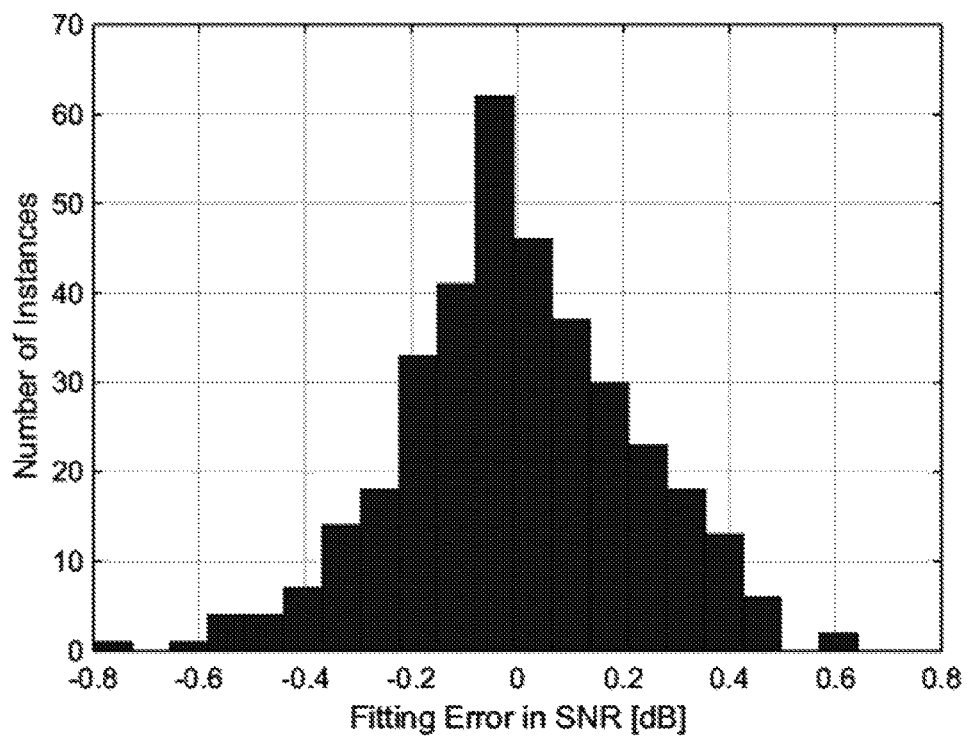
FIG. 9, FIG. 10, FIG. 11, FIG. 12, FIG. 13, and FIG. 14 illustrate fitting errors in Signal to Noise Ratio (SNR) for various 16 Quadrature Amplitude Modulation (16QAM) simulations regarding intra-channel Kerr noise.

Simulations were performed for applications with 16QAM modulation. Using net chromatic dispersion only to fit the results of the simulations using a second order polynomial regression as in equation (57) above, the coefficients obtained were $c_0 = 21.93$, $c_1 = -9.112$, and $c_2 = 1.055$ with a root mean square error (RMSE) of 0.2214 dB. The fitting error in SNR (dB) is illustrated in FIG. 9.

Figure 10:
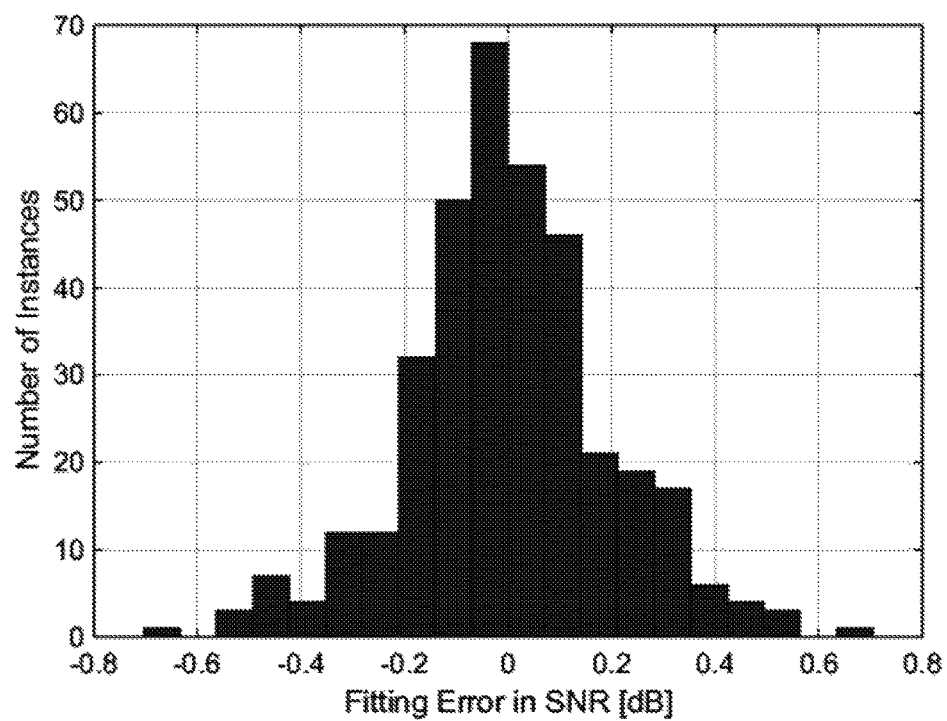

Using both net chromatic dispersion and link length to fit the results as in equation (58) above, the coefficients obtained were $c_0 = 19.6769$, $c_1 = -7.3748$, $c_2 = -0.2014$, $c_3 = 0.7243$, $c_4 = 0.0865$, and $c_5 = -0.0070$ with a root mean square error (RMSE) of 0.1971 dB. The fitting error in SNR (dB) is illustrated in FIG. 10.

Figure 11:
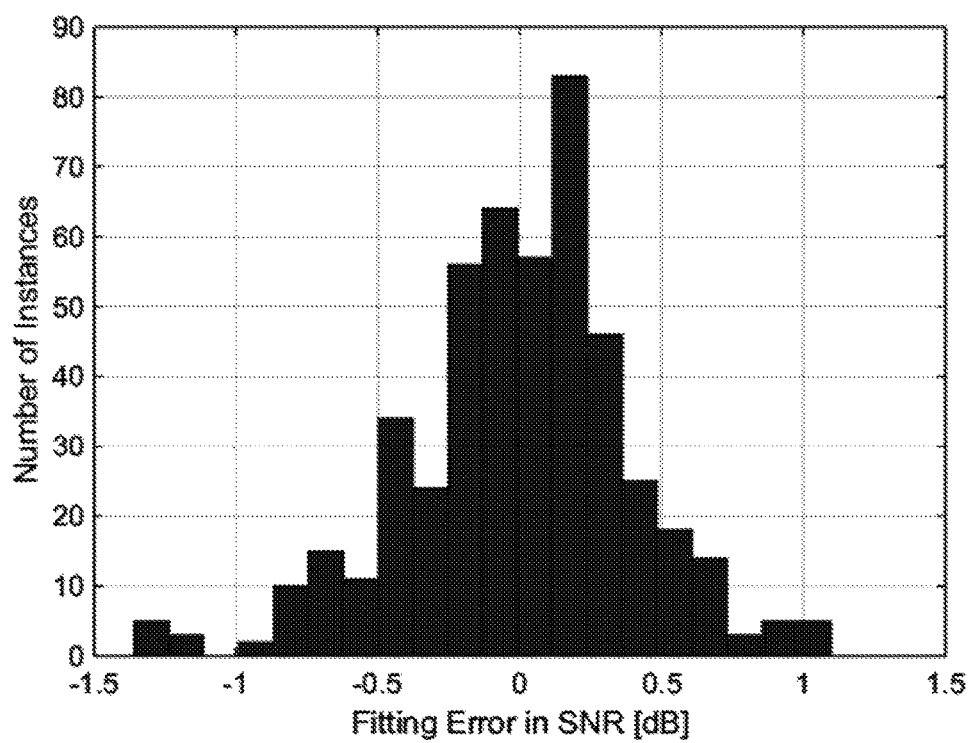

Even with reduced complexity, calibration information can be determined. For example, evaluating the quantity $P_{X\ or\ Y}[0]$ given in equation (52) or (54) above with a half-width of 10 symbols yields the following fitting results with net chromatic dispersion and link length: $c_0 = 38.9976$, $c_1 = -21.1308$, $c_2 = 0.7726$, $c_3 = 3.4388$, $c_4 = -0.1241$, and $c_5 = -0.0102$ with a root mean square error (RMSE) of 0.4008 dB. The fitting error in SNR (dB) is illustrated in FIG. 11.

Figure 12:
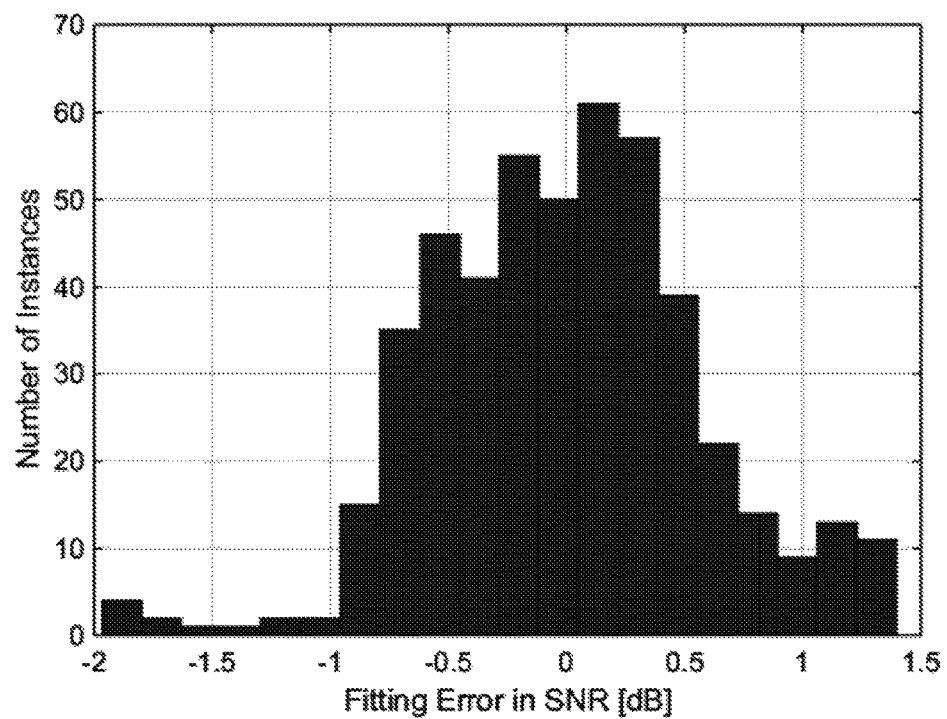

Similarly, evaluating the quantity $P_{X\ or\ Y}[m]$ given in equation (51) or (53) above for m=1 with a half-width of 20 symbols yields the following fitting results with net chromatic dispersion and link length: $c_0 = 17.4486$, $c_1 = -3.3473$, $c_2 = 0.2427$, $c_3 = 0.0016$, $c_4 = 0.1418$, and $c_5 = -0.0338$ with a root mean square error (RMSE) of 0.5731 dB. The fitting error in SNR (dB) is illustrated in FIG. 12.

Using the symbol error as the calibration attribute, one could consider:

$$\text{NL-NSR}_{INTRA,X\ or\ Y}' = \text{NL-NSR}_{INTRA,X\ or\ Y} \cdot f(CD_{net}, D_{avg}, SER, \text{NL-NSR}_{INTRA,X\ or\ Y}) \quad (59)$$

here $\text{NL-NSR}_{INTRA,X\ or\ Y}$ is the calibrated estimation, $f(\bullet)$ is the calibration relationship for application-dependent systematic errors as well as symbol error rate (SER)-induced errors, $CD_{net}$ is the net chromatic dispersion, and $D_{avg}$ is the average dispersion.

Figure 13:
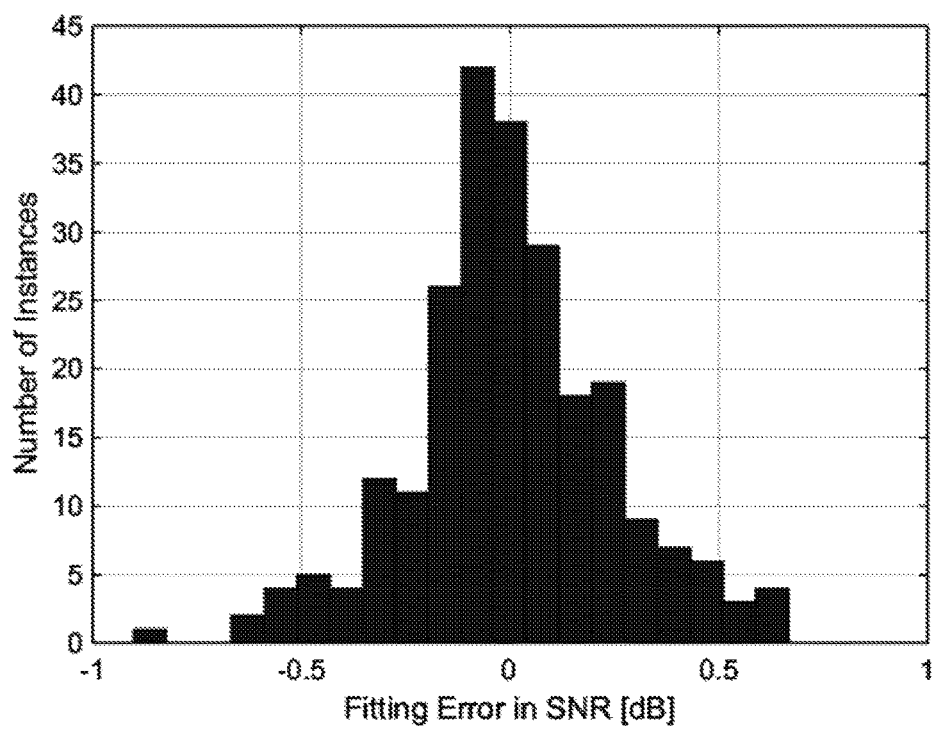
Figure 14:
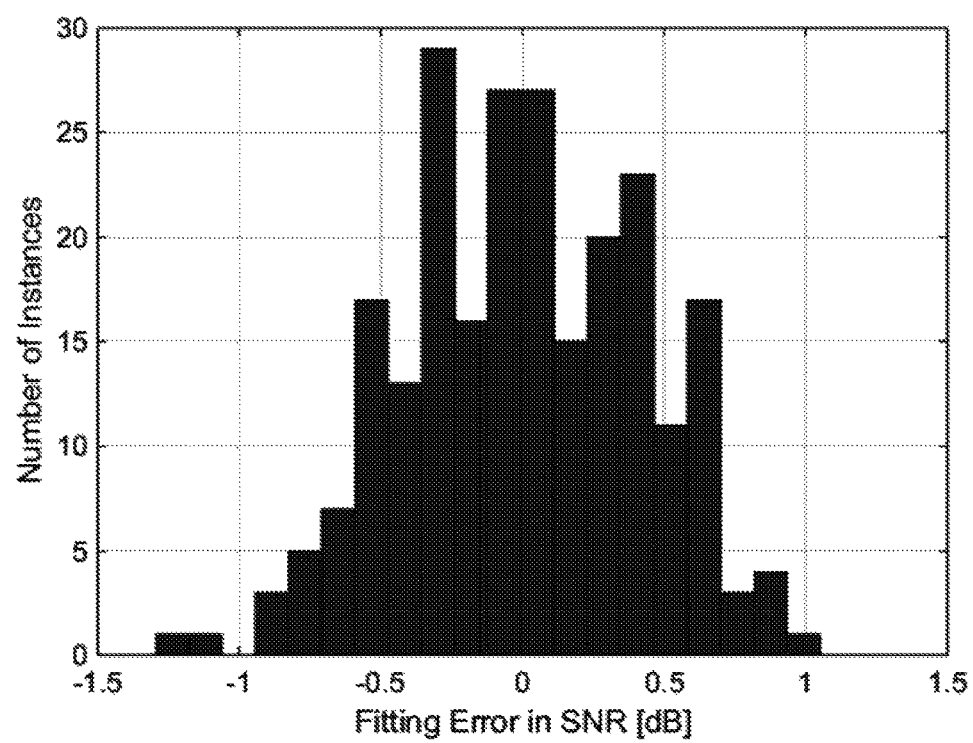
Figure 15:
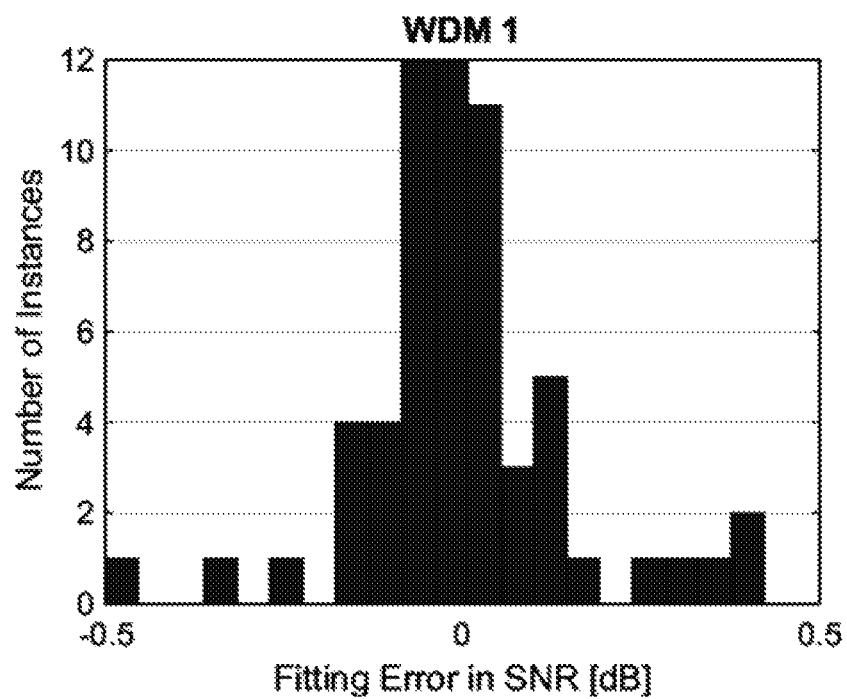
FIG. 15, FIG. 16, FIG. 17, and FIG. 18 illustrate fitting errors in Signal to Noise Ratio (SNR) for various Quadrature Phase Shift Keying (QPSK) modulation simulations regarding total Kerr noise.
Figure 16:
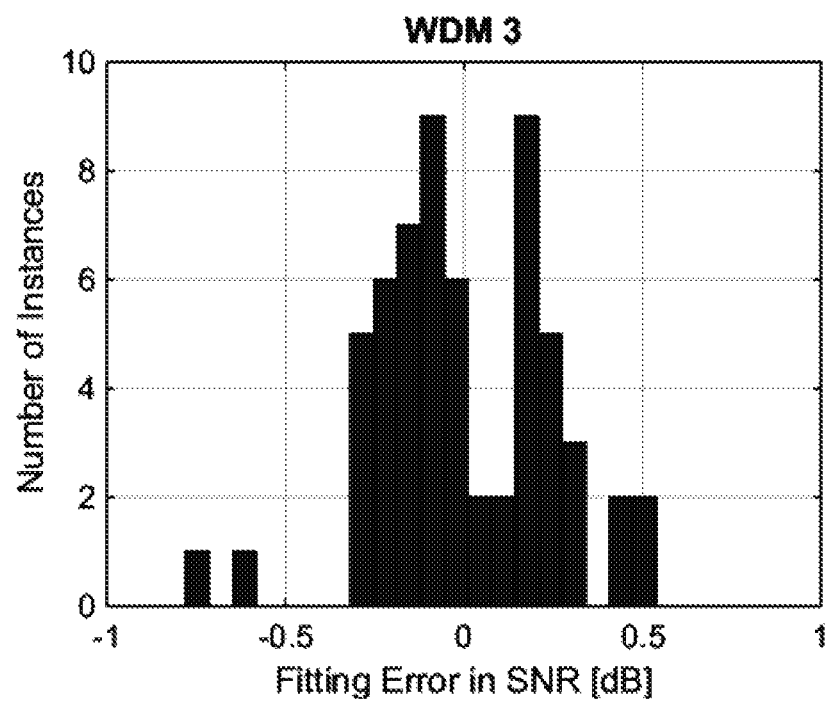
Figure 17:
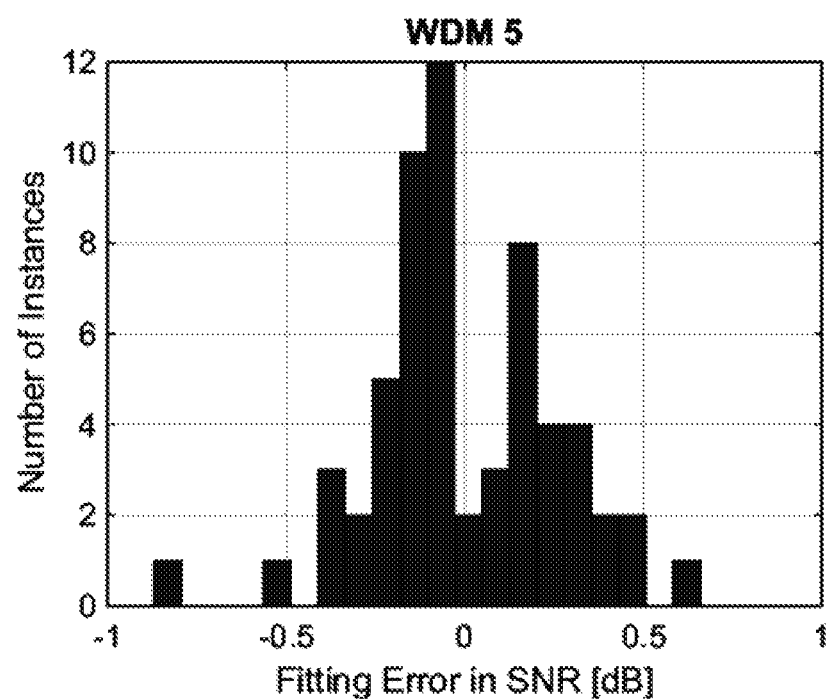
Figure 18:
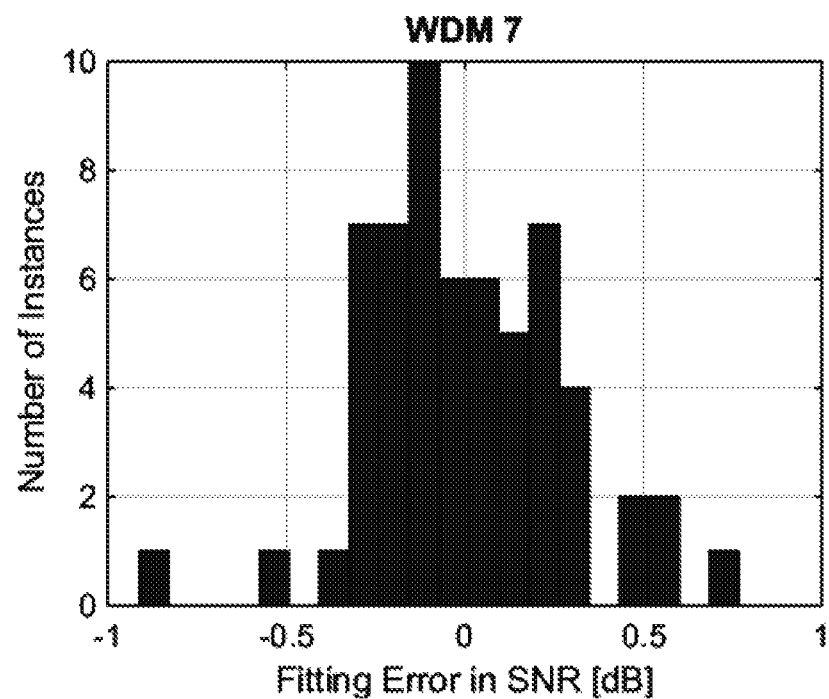
Figure 19:
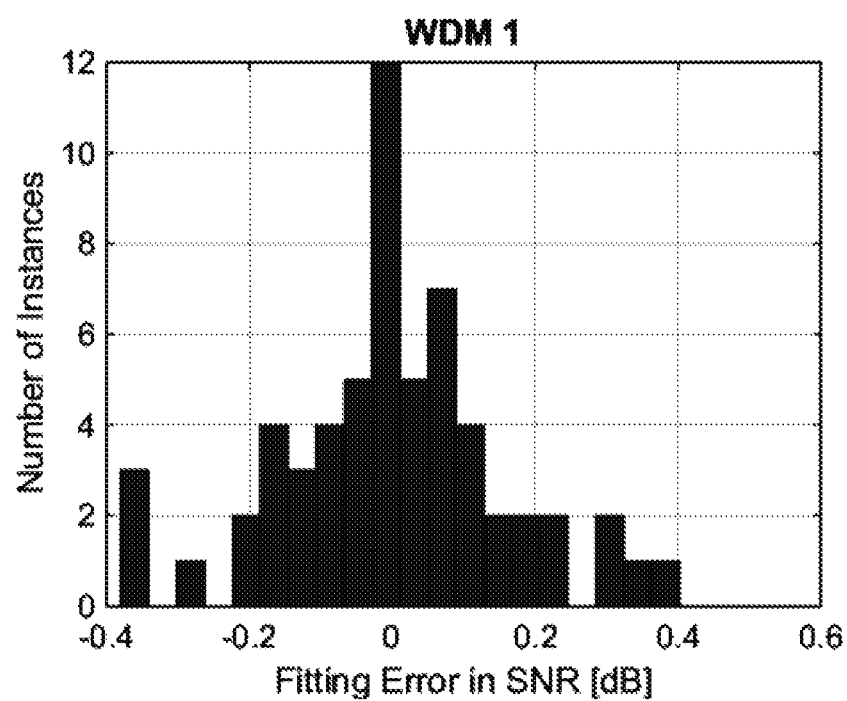
FIG. 19, FIG. 20, FIG. 21, and FIG. 22 illustrate fitting errors in Signal to Noise Ratio (SNR) for various 16 Quadrature Amplitude Modulation (16QAM) simulations regarding total Kerr noise.
Figure 20:
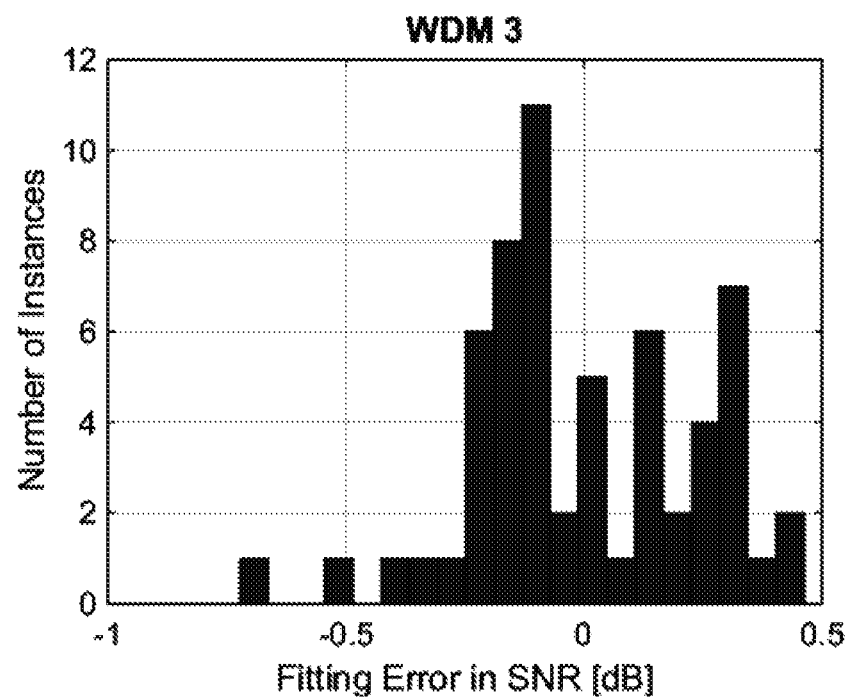
Figure 21:
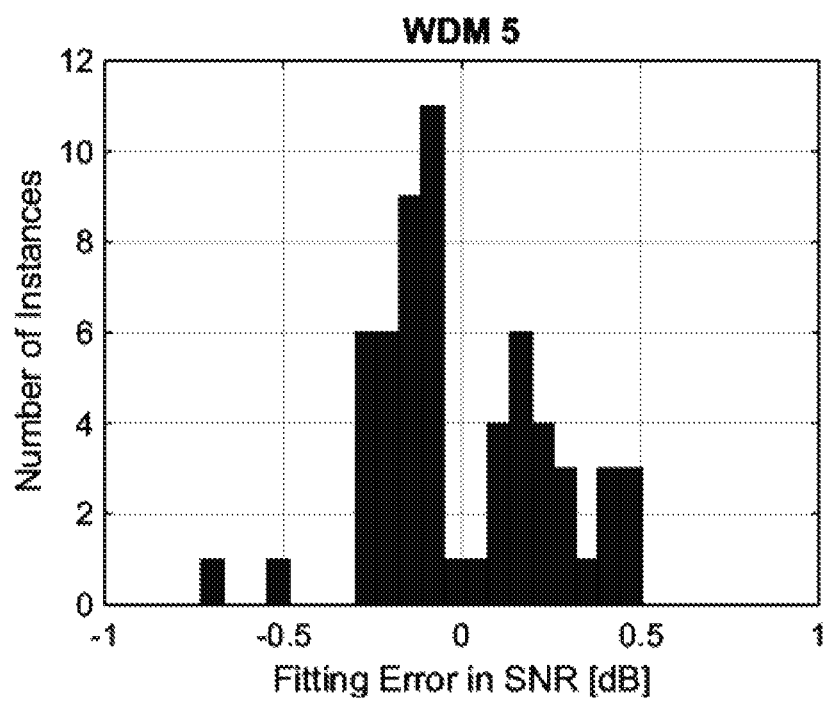
Figure 22:
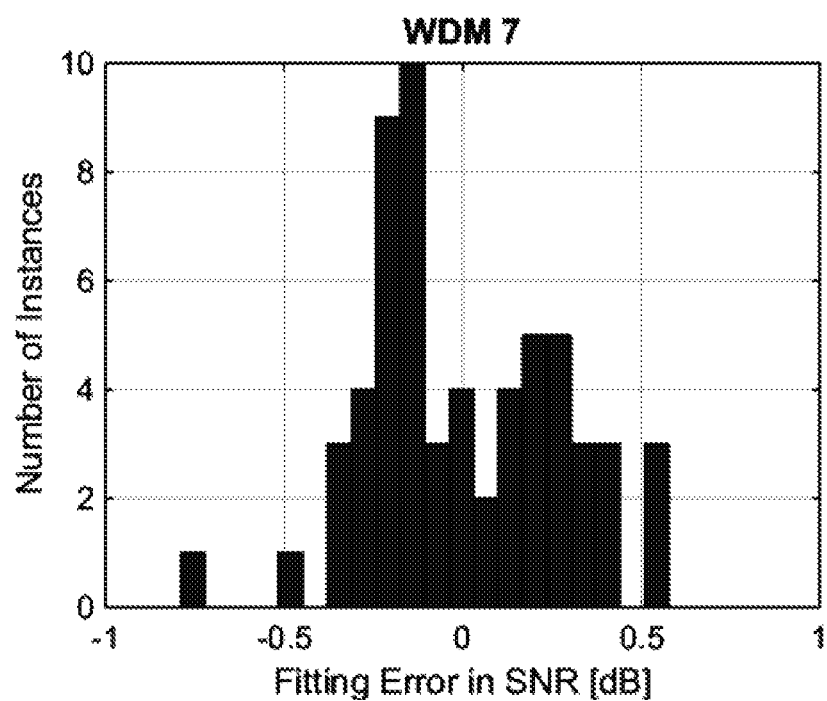

Assuming the implementation noise is 16.8 dB and the total SNR is 11.5 dB (3.4% BER threshold for 16QAM), if the nonlinear noise is a third of the total other noise, the nonlinear SNR is 17.8 dB. In the 60 applications in Table 1, applications with nonlinear SNR in the range of 14-21 dB were chosen, which results in 30 applications. In the following results, a second order polynomial function with four variables was used to fit the simulation results. Evaluating the quantity $P_{X \, or \, Y}[0]$ given in equation (52) or (54) above with a half-width of 10 symbols yielded an RMSE of 0.2475 dB and the fitting error in SNR is illustrated in FIG. 13. Evaluating the quantity $P_{X \, or \, Y}[m]$ given in equation (51) or (53) above for m=1 with a half-width of 20 symbols yielded an RMSE of 0.4240 dB and the fitting error in SNR is illustrated in FIG. 14. Because of the reduced number of applications, the RMSE value is actually reduced compared to the other 16QAM results discussed above in this document. For the purpose of comparison, the RMSE is 0.2203 dB and 0.3454 dB respectively with these 30 applications. Therefore, the extra standard deviation caused by SER calibration is very small in the intra-channel nonlinear estimation.

Calibration of Total Kerr Nonlinear Noise-to-Signal Ratio Using Polynomials

Simulations involving the applications listed in Table 1 and evaluating the quantities given in equations (27), (28) and (29) above for N=10 were performed.

A second order two-variable polynomial model was used to fit the simulated data as $$\varepsilon = c_0 + c_1 \cdot x + c_2 \cdot y + c_3 \cdot x^2 + c_4 \cdot xy + c_5 \cdot y^2 \qquad (60)$$

where $\varepsilon$ is the offset in dB, $x = \log_{10}$ (net chromatic dispersion in ps/nm), and y=[net chromatic dispersion in ps/nm]/[link length in km].

Fitting results for WDM channels 1, 3, 5 and 7 for QPSK are illustrated in FIG. 15, FIG. 16, FIG. 17 and FIG. 18, respectively. The coefficients obtained are summarized in Table 2.

TABLE 2

Fitting results with net chromatic dispersion and link length for different WDM cases for QPSK

| | Fitting coefficients | RMS (dB) | Rsquare |
|---|---|---|---|
| WDM ch 1 | $\vec{c}$ = [−0.2924, −0.9895, 0.0625, 0.2055, 0.0464, −0.0114] | 0.1510 | 0.9613 |
| WDM ch 3 | $\vec{c}$ = [7.0640, −4.2868, 0.2040, 0.6243, 0.0540, −0.0223] | 0.2504 | 0.8908 |
| WDM ch 5 | $\vec{c}$ = [7.9336, −4.6839, 0.2533, 0.6915, 0.0399, −0.0226] | 0.2618 | 0.8770 |
| WDM ch 7 | $\vec{c}$ = [10.5651, −5.5514, 0.1515, 0.7590, 0.0611, −0.0218] | 0.2788 | 0.8229 |

Fitting results for WDM channels 1, 3, 5 and 7 for 16QAM are illustrated in FIG. 19, FIG. 20, FIG. 21 and FIG. 22, respectively. The coefficients obtained are summarized in Table 3.

TABLE 3

Fitting results with net chromatic dispersion and link length for different WDM cases for QPSK

| | Fitting coefficients | RMS (dB) | Rsquare |
|---|---|---|---|
| WDM ch 1 | $\vec{c}$ = [5.5340, −4.9668, 0.1698, 0.8156, 0.0000, −0.0075] | 0.1591 | 0.9585 |
| WDM ch 3 | $\vec{c}$ = [7.4041, −4.9358, 0.2256, 0.7388, 0.0413, −0.0203] | 0.2375 | 0.9120 |
| WDM ch 5 | $\vec{c}$ = [8.6977, −5.5329, 0.2575, 0.8064, 0.0461, −0.0233] | 0.2515 | 0.9054 |

TABLE 3-continued

Fitting results with net chromatic dispersion and link length for different WDM cases for QPSK

| | Fitting coefficients | RMS (dB) | Rsquare |
|---|---|---|---|
| WDM ch 7 | $\vec{c}$ = [8.7642, −5.4589, 0.3049, 0.8062, 0.0234, −0.0211] | 0.2716 | 0.8750 |

Calibration of Intra-Channel Kerr Nonlinear Noise-to-Signal Ratio and Total Kerr Nonlinear Noise-to-Signal Ratio Using Neural Network A neural network implementation is used to improve the accuracy of the determination of intra-channel Kerr nonlinear noise-to-signal ratio and of total Kerr nonlinear noise-to-signal ratio by training the neural network with data sets of known inputs and known outputs (the outputs being related to the intra-channel Kerr nonlinearity and to the total Kerr nonlinearity), and then applying the trained neural network to actual inputs. For example, neural network structures having two outputs may be used, with one output related to the intra-channel Kerr nonlinearity (for example, $NL\text{-}NSR_{INTRA,X \, or \, Y}$) and the other output related to the total Kerr nonlinearity (for example, $NL\text{-}NSR_{TOTAL}$). The inputs may include the coefficients of the C-matrices $C_X$, $C_Y$, $C_{XY}$, and $C_{YX}$, and doublet correlations (for example, any one or any combination of the doublet correlations of equations (30) through (47)). The inputs may also include the results obtained by pre-processing the C-matrices and the one or more doublet correlations. The inputs may also include one or more attributes of the link, for example, one or more of net chromatic dispersion, link length, fiber type, span length, WDM configuration, and the like.

Figure 23:
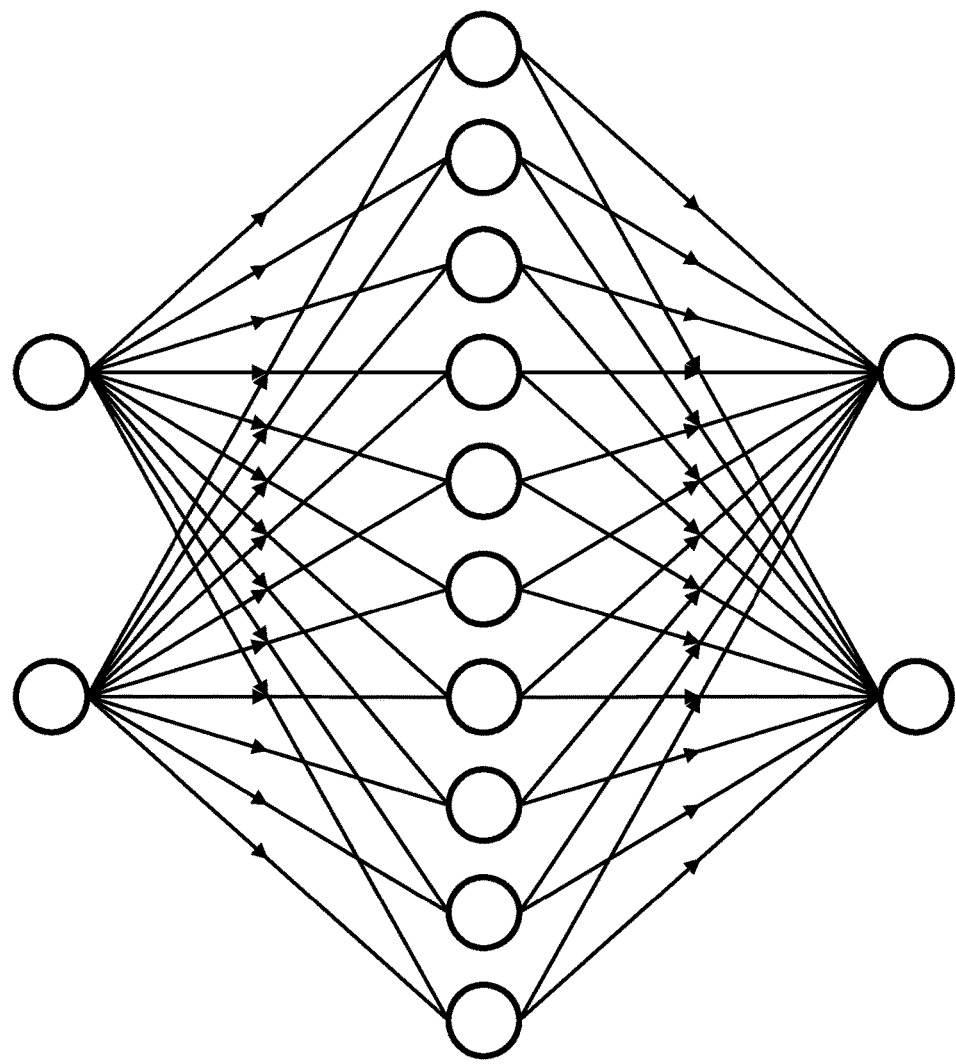
FIG. 23 illustrates an example neural network structure having two inputs, ten hidden nodes, and two outputs.
Figure 24:
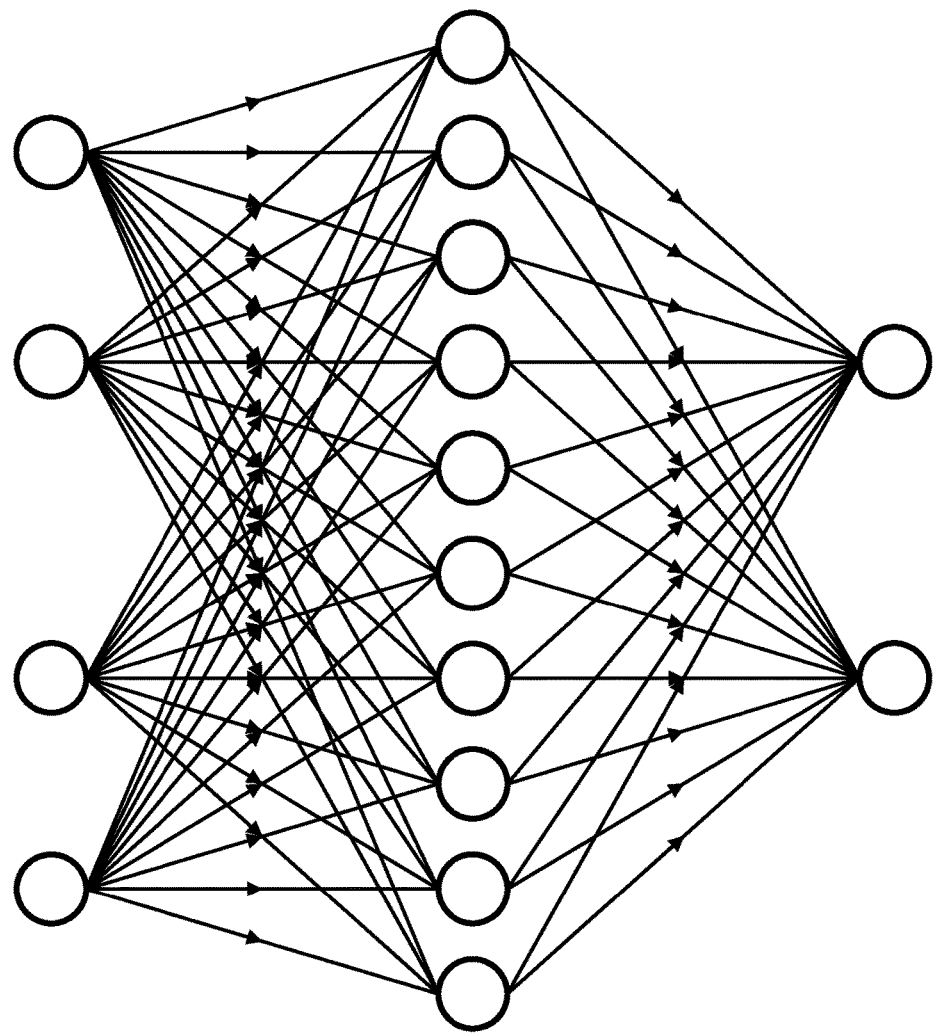
FIG. 24 illustrates another example neural network structure having four inputs, ten hidden nodes, and two outputs.

FIG. 23 illustrates an example neural network structure having two inputs, a single hidden layer with ten nodes, and two outputs. FIG. 24 illustrates another example neural network structure having four inputs, a single hidden layer with ten nodes, and two outputs. In both examples, the two outputs are intra-channel Kerr nonlinearity and total Kerr nonlinearity, and two of the inputs are C-matrix measurements and doublet correlation. In the example neural network structure having four inputs, the additional two inputs are net chromatic dispersion and link length.

To train the neural network, and then to demonstrate the performance of the trained neural network, the applications listed above in Table 1 were considered, for 56.8 Gbaud signals with 62.5 GHz spacing, using dual polarization 16 quadrature amplitude modulation (DP-16QAM), 60 links, 70% training and 30% testing.

Figure 25:
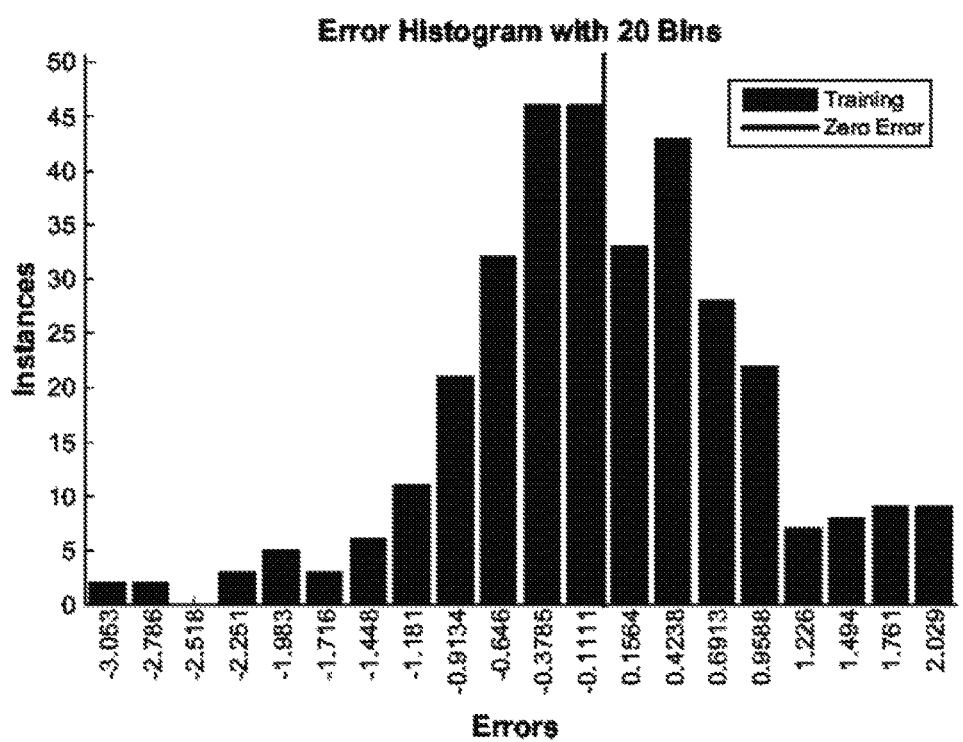
FIG. 25 illustrates error histograms for training samples for the example neural network structure illustrated in FIG. 23.
Figure 26:
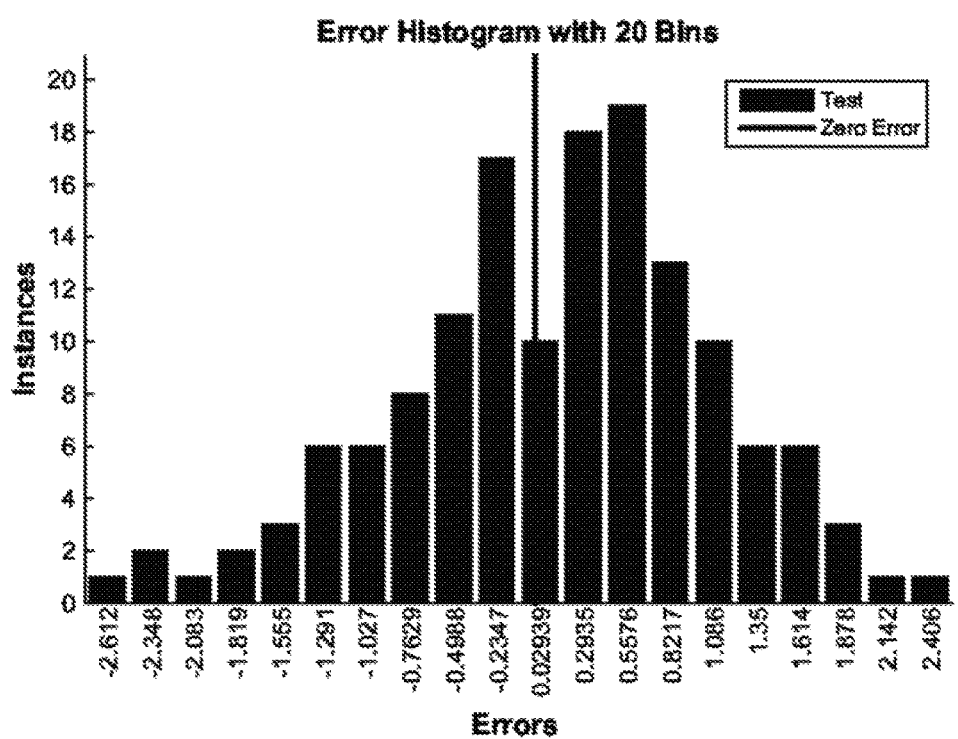
FIG. 26 illustrates error histograms for test samples for the example neural network structure illustrated in FIG. 23.
Figure 27:
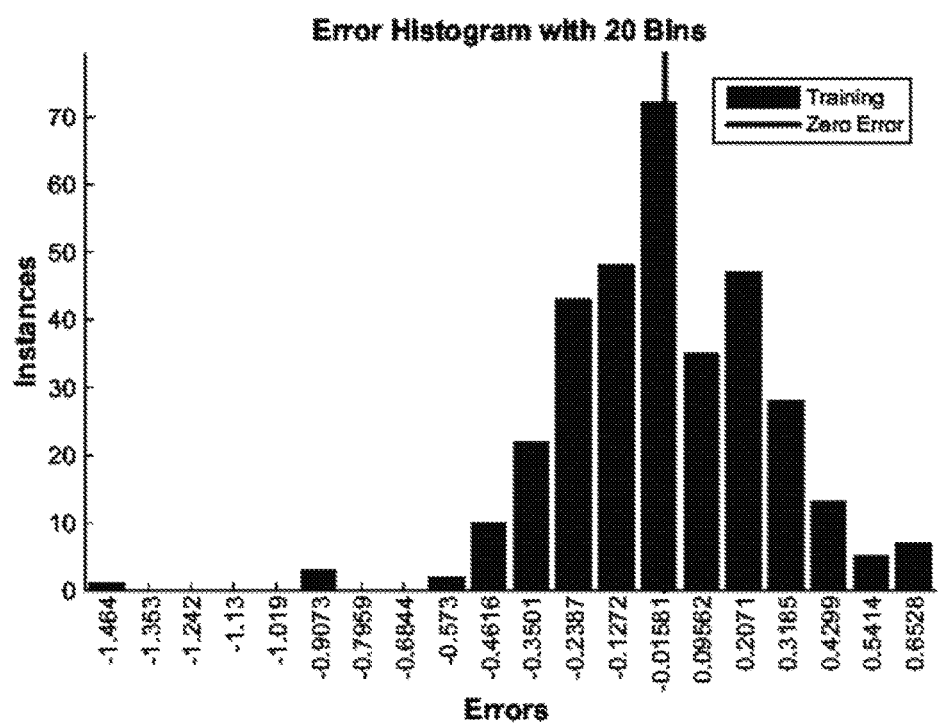
FIG. 27 illustrates error histograms for training samples for the example neural network structure illustrated in FIG. 24.
Figure 28:
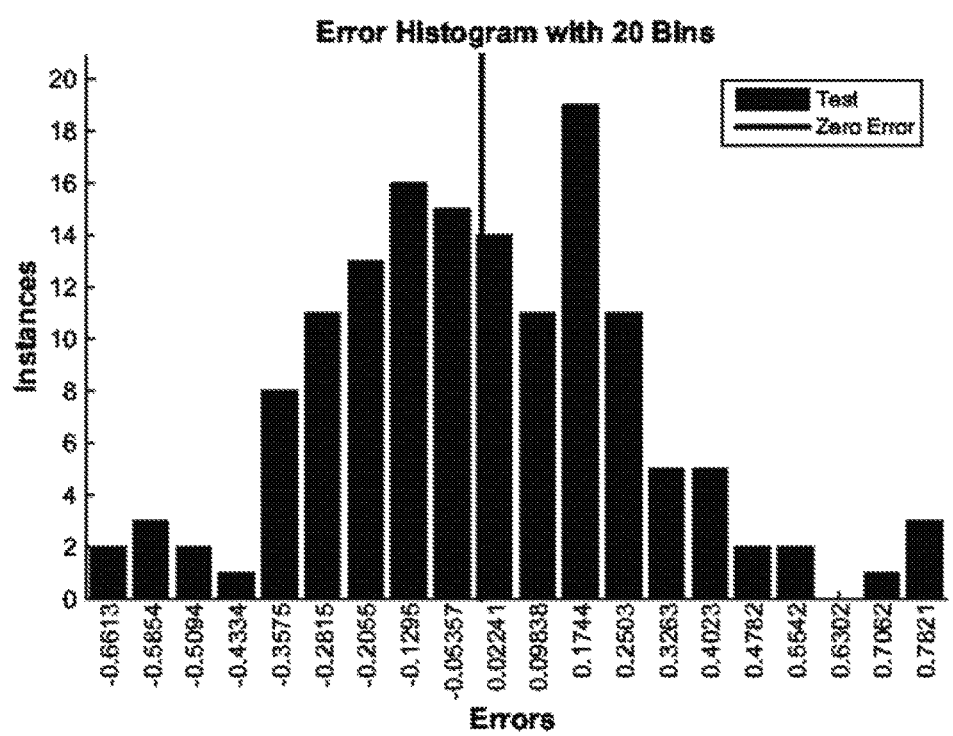
FIG. 28 illustrates error histograms for test samples for the example neural network structure illustrated in FIG. 24.

Error histograms for training samples and test samples are illustrated in FIG. 25 and FIG. 26, respectively, for the example neural network structure having two inputs illustrated in FIG. 23. With two inputs, the training mean square error (MSE) was 0.84 Db and the test MSE was 0.94 dB. Error histograms for training samples and test samples are illustrated in FIG. 27 and FIG. 28, respectively, for the example neural network structure having four inputs illustrated in FIG. 24. With four inputs, the training mean square error (MSE) was 0.075 Db and the test MSE was 0.079 dB.

What is claimed is:

1. A method of fiber Kerr nonlinear noise estimation in an optical transmission system, the method comprising:
  recovering received symbols from a received optical signal;
  isolating a noise component of the received optical signal from the received symbols and from either training symbols or estimated transmitted symbols determined from the received symbols;

estimating coefficients of a matrix based on cross-correlations between the isolated noise component and fields of a triplet of received symbols or training symbols or estimated transmitted symbols;

estimating doublet correlations of a product or a quotient of the isolated noise component and a field of a received symbol or of a training symbol or of an estimated transmitted symbol; and estimating one or more parameters related to nonlinear noise based on the estimated coefficients of the matrix and based on the estimated doublet correlations.

2. The method as recited in claim 1, wherein estimating the one or more parameters related to nonlinear noise comprises:

applying a trained machine learning function to one or more inputs, the trained machine learning function having as output the one or more parameters related to nonlinear noise.

3. The method as recited in claim 2, wherein the one or more parameters related to nonlinear noise include an intra-channel nonlinear noise-to-signal ratio.

4. The method as recited in claim 2, wherein the one or more parameters related to nonlinear noise include the total Kerr nonlinear noise-to-signal ratio.

5. The method as recited in claim 2, wherein the one or more parameters related to nonlinear noise include an optical signal-to-noise ratio.

6. The method as recited in claim 2, wherein the one or more inputs include the estimated coefficients of the matrix and/or results obtained by pre-processing the estimated coefficients of the matrix.

7. The method as recited in claim 2, wherein the one or more inputs include the estimated doublet correlations and/or results obtained by pre-processing the estimated doublet correlations.

8. The method as recited in claim 2, wherein the one or more inputs include one or more attributes of a fiber link over which the received optical signal was transmitted.

9. The method as recited in claim 1, wherein estimating the one or more parameters related to nonlinear noise comprises:

estimating an intra-channel nonlinear noise-to-signal ratio from the estimated coefficients of the matrix;

estimating a total Kerr nonlinear noise-to-signal ratio from the estimated doublet correlations; and correcting the estimated intra-channel nonlinear noise-to-signal ratio and the estimated total Kerr nonlinear noise-to-signal ratio using calibrations based on one or more attributes of a fiber link over which the received optical signal was transmitted.

10. The method as recited in claim 9, wherein estimating the total Kerr nonlinear noise-to-signal ratio is based on intra-polarization doublet correlations.

11. The method as recited in claim 9, wherein estimating the total Kerr nonlinear noise-to-signal ratio is based on cross-polarization doublet correlations.

12. The method as recited in claim 9, wherein estimating the intra-channel nonlinear noise-to-signal ratio is based on coefficients of intra-polarization matrices.

13. The method as recited in claim 9, wherein estimating the intra-channel nonlinear noise-to-signal ratio is based on coefficients of cross-polarization matrices.

14. The method as recited in claim 9, wherein the calibrations involve polynomials that relate the one or more attributes of the fiber link to an error in the estimated intra-channel nonlinear noise-to-signal ratio and the estimated total Kerr nonlinear noise-to-signal ratio, and coefficients of the polynomials have been determined using fitting techniques.

15. A coherent optical receiver comprising:

a digital signal processor (DSP) implementing at least a carrier recovery module operative to recover received symbols from a received signal, the DSP implementing a decision block operative to output decisions regarding the received symbols and from which estimated transmitted symbols can be derived;

components operative to isolate a noise component of the received signal from the received symbols and from either training symbols or the estimated transmitted symbols; and a nonlinear noise-to-signal ratio (NSR) calculator operative to estimate coefficients of a matrix based on cross-correlations between the isolated noise component and fields of a triplet of received symbols or training symbols or estimated transmitted symbols;

estimate doublet correlations of a product or a quotient of the isolated noise component and a field of a received symbol or of a training symbol or of an estimated transmitted symbol; and estimate one or more parameters related to nonlinear noise based on the estimated coefficients of the matrix and based on the estimated doublet correlations.

16. The coherent optical receiver as recited in claim 15, wherein the nonlinear NSR calculator is operative to estimate the one or more parameters related to nonlinear noise by applying a trained machine learning function to one or more inputs, the trained machine learning function having as output the one or more parameters related to nonlinear noise.

17. The coherent optical receiver as recited in claim 16, wherein the one or more inputs include the estimated coefficients of the matrix and/or results obtained by pre-processing the estimated coefficients of the matrix.

18. The coherent optical receiver as recited in claim 16, wherein the one or more inputs include the estimated doublet correlations and/or results obtained by pre-processing the estimated doublet correlations.

19. The coherent optical receiver as recited in claim 15, wherein the nonlinear NSR calculator is operative to estimate the one or more parameters related to nonlinear noise by:

estimating an intra-channel nonlinear noise-to-signal ratio from the estimated coefficients of the matrix;

estimating a total Kerr nonlinear noise-to-signal ratio from the estimated doublet correlations; and correcting the estimated intra-channel nonlinear noise-to-signal ratio and the estimated total Kerr nonlinear noise-to-signal ratio using calibrations based on one or more attributes of a fiber link over which the received signal was transmitted.

20. The coherent optical receiver as recited in claim 19, wherein the calibrations involve polynomials that relate the one or more attributes of the fiber link to an error in the estimated intra-channel nonlinear noise-to-signal ratio and the estimated total Kerr nonlinear noise-to-signal ratio, and coefficients of the polynomials have been determined using fitting techniques.

* * * * *

UNITED STATES PATENT AND TRADEMARK OFFICE
CERTIFICATE OF CORRECTION

PATENT NO.         : 10,090,920 B1
APPLICATION NO.    : 15/461718
DATED              : October 2, 2018
INVENTOR(S)        : Qunbi Zhuge, Michael Andrew Reimer and Maurice O'Sullivan Page 1 of 1

It is certified that error appears in the above-identified patent and that said Letters Patent is hereby corrected as shown below:

In the Specification

At Column 3, Line 33, equation (2) should read:

$$\frac{\partial \Delta A}{\partial z} - \frac{i\beta_2}{2}\frac{\partial^2 \Delta A}{\partial t^2} + \frac{\alpha}{2}\Delta A = -i\gamma |A|^2 A \qquad (2)$$

At Column 13, Line 67, equation (58) should read:

$$\varepsilon = c_0 + c_1 \cdot x + c_2 \cdot y + c_3 \cdot x^2 + c_4 \cdot xy + c_5 \cdot y^2 \qquad (58)$$

Signed and Sealed this
Sixth Day of November, 2018

Andrei Iancu
*Director of the United States Patent and Trademark Office*